US009851815B2

(12) United States Patent
Hwang et al.

(10) Patent No.: US 9,851,815 B2
(45) Date of Patent: Dec. 26, 2017

(54) SYSTEM, METHOD FOR CONTROLLING USER TERMINAL USING MAGNETIC FIELD, USER TERMINAL COMPRISING THE SAME

(71) Applicant: KOREA ADVANCED INSTITUTE OF SCIENCE AND TECHNOLOGY, Daejeon (KR)

(72) Inventors: Sung Jae Hwang, Daejeon (KR); Andrea Bianchi, Gyeonggi-do (KR); Ian Oakley, Ulsan (KR); Kwang Yun Wohn, Daejeon (KR); Myung Wook Ahn, Seoul (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 19 days.

(21) Appl. No.: 14/036,243

(22) Filed: Sep. 25, 2013

(65) Prior Publication Data

US 2014/0085271 A1 Mar. 27, 2014

(30) Foreign Application Priority Data

Sep. 26, 2012 (KR) .......................... 10-2012-0107420

(51) Int. Cl.
| | | |
|---|---|---|
| G06F 3/033 | (2013.01) | |
| G06F 3/0354 | (2013.01) | |
| G06F 3/01 | (2006.01) | |
| G06F 3/046 | (2006.01) | |
| G06F 3/0346 | (2013.01) | |

(52) U.S. Cl.
CPC .......... G06F 3/03545 (2013.01); G06F 3/017 (2013.01); G06F 3/0346 (2013.01); G06F 3/046 (2013.01); *G06F 2203/04101* (2013.01)

(58) Field of Classification Search
CPC .............................. G06F 3/03545; G06F 3/033
See application file for complete search history.

(56) References Cited

U.S. PATENT DOCUMENTS

| | | | | |
|---|---|---|---|---|
| 2001/0001430 A1* | 5/2001 | Ely | ....................... | G01D 5/2073 178/18.03 |
| 2004/0160429 A1* | 8/2004 | Blake | .................. | G06F 3/03545 345/179 |
| 2006/0170652 A1* | 8/2006 | Bannai | ..................... | G06F 3/011 345/156 |
| 2009/0153525 A1* | 6/2009 | Chang | ................. | G06F 3/04883 345/179 |
| 2012/0092267 A1* | 4/2012 | Haug | .................... | G06F 3/0383 345/173 |
| 2012/0223935 A1* | 9/2012 | Renwick | ............... | G06F 3/0488 345/419 |

* cited by examiner

*Primary Examiner* — Jennifer Mehmood
*Assistant Examiner* — Carl Adams

(57) ABSTRACT

Provided is a system for controlling a user terminal, comprising a sensing unit to sense a motion of an object in a shape of a rod that can be held between fingers of a user, and a control unit to generate a control command for controlling the user terminal based on a motion pattern of the object sensed by the sensing unit, wherein the motion is a spinning motion of the object.

14 Claims, 33 Drawing Sheets

$$\text{Curvedness}(P) = \sum_{i=0}^{n-2} \frac{\Sigma_{j=i}^{i+1} \text{distance}(P_j, P_{j+1})}{\text{distance}(P_i, P_{i+2})}$$

$$\text{distance}(A,B) = \sqrt{(B_x - A_x)^2 + (B_y - A_y)^2 + (B_z - A_z)^2}$$

$P_n$ = End point $P_1$ = Starting point

FIG. 11

J48 pruned tree
------------ avg_speed <=1.59654: spinning gesture (30.0)
avg_speed > 1.59654: normal gesture (30.0)

Number of leaves :   2

Size of the tree:    3

Time taken to build model: 0.01 seconds

===Stratified cross-validation===
===Summary===

Correctly classified Instances     59          98.3333%
Incorrectly Classified Instances    1           1.6667%
Kappa statistic                    0.9667
Mean absolute error                0.0167
Root mean squaned error            0.1291
Relative absolute error                 3.3333%
Root leative squared error        25.8199%
Total Number of Instances          60

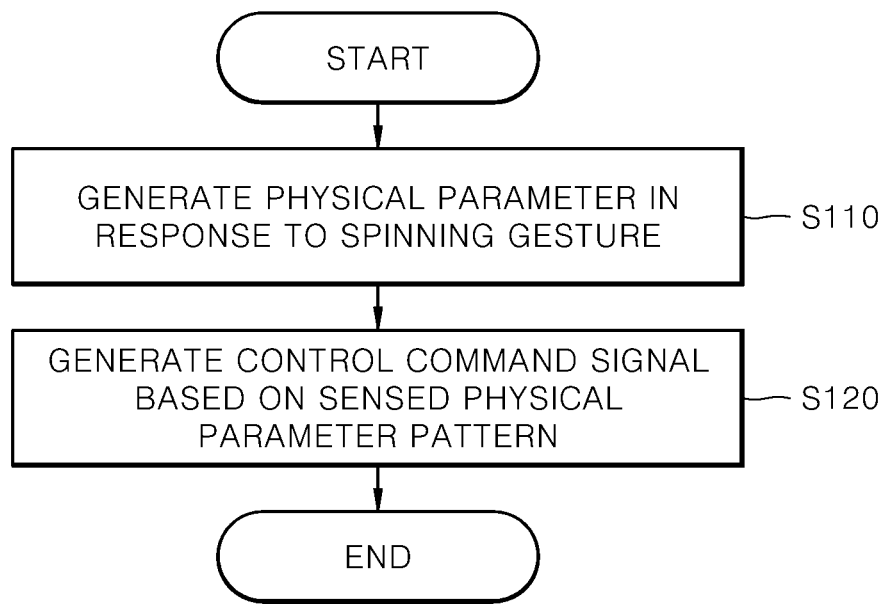

FIG. 43
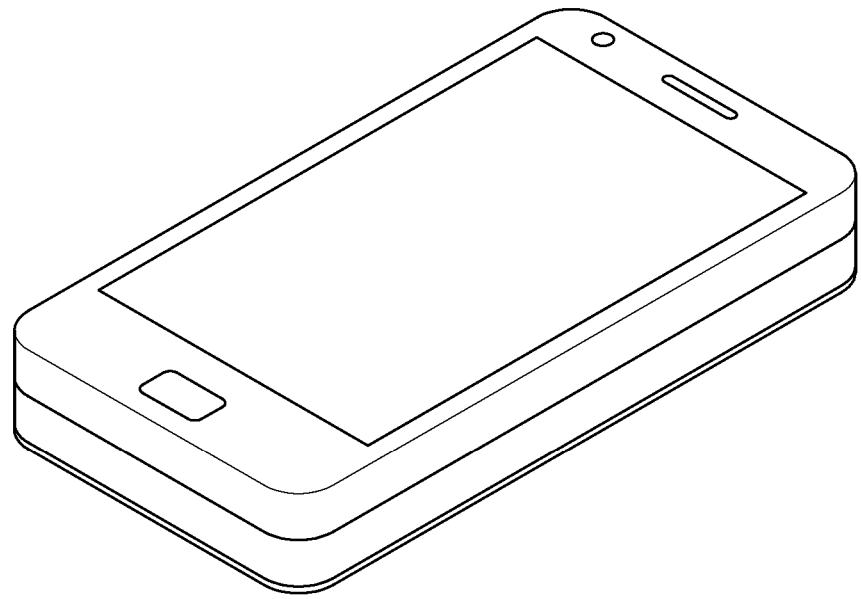
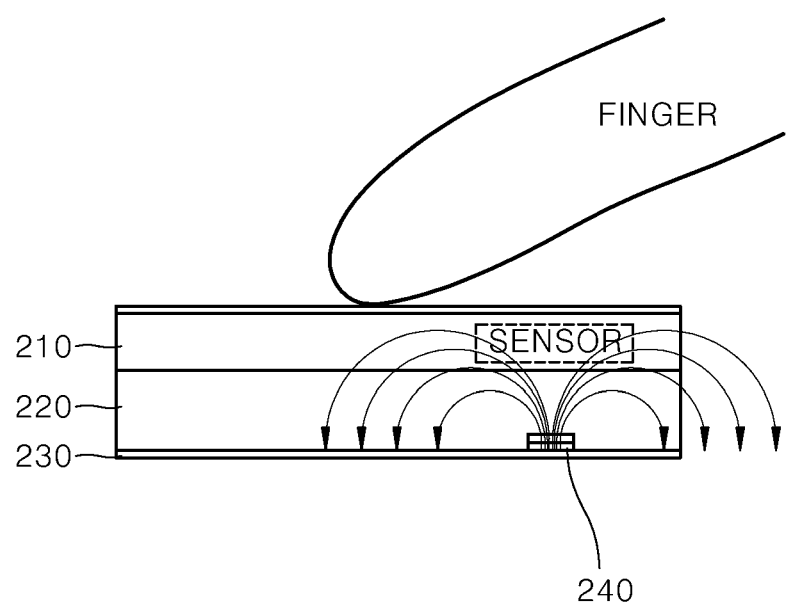

FIG. 46
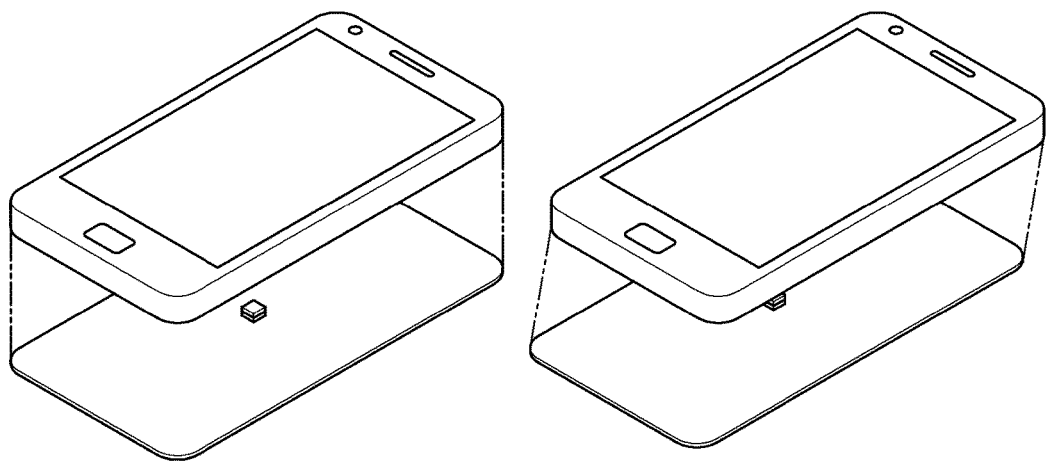
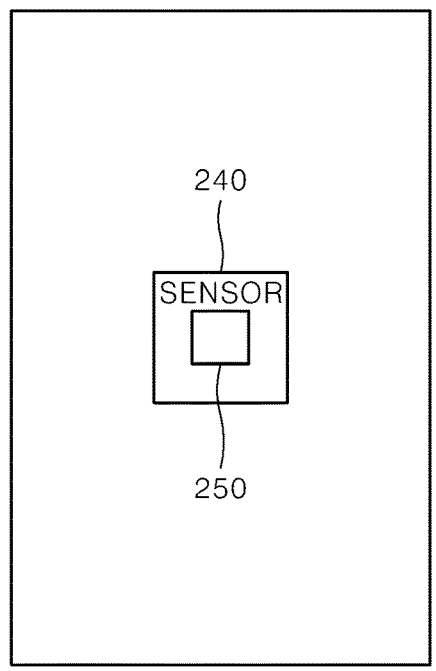
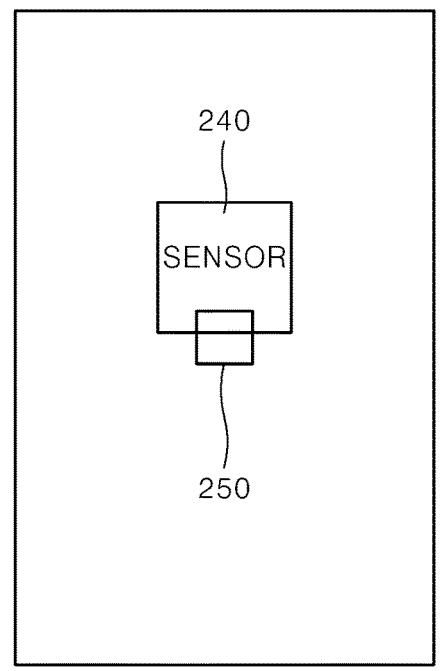

SYSTEM, METHOD FOR CONTROLLING USER TERMINAL USING MAGNETIC FIELD, USER TERMINAL COMPRISING THE SAME

CROSS-REFERENCE TO RELATED APPLICATIONS

This application claims priority of Korean Patent Application No. 10-2012-0107420, filed on Sep. 26, 2012, in the KIPO (Korean Intellectual Property Office), the disclosure of which is incorporated herein by reference in its entirety.

TECHNICAL FIELD

The present disclosure relates to a system and method for controlling a user terminal using a magnetic field, and a user terminal comprising the same.

BACKGROUND

With the development of information and communication technologies, studies have been conducted on various types of interaction methods between human and machine. Among them, an effective input means for a user terminal has been developed. For example, a capacitive touch screen being widely used these days has an advantage of determining whether an input is received through a proximity contact between an input means such as a human finger and the touch screen and executing a command conveniently using the finger, but has a limitation in that only two input activities of a user, that is, a touch and a release, are acceptable, and a disadvantage of limited haptic representations transmittable to the user due to a flat shape and an issue of finger occlusion occurring frequently during interaction with the user due to a relatively small size. To relieve these problems, many researchers have been studying interaction methods through an object such as a stylus pen.

Among these methods, some methods include, for example, pen rolling, pen tiling, touch screen touch type recognition, pen grip type recognition, and the like. A pen rolling technique uses an activity of rolling a pen around an axis of the pen as a mode change command, and similarly, various techniques of selecting a menu based on a tiling angle have been introduced. Also, recently, a pen that recognizes a pen grip type through a multi-touch sensor and executes different commands based on the pen grip type has been introduced. Further, a pen that executes different command based on a touched portion of a display, for example, a corner, an edge, an end, or a side, has been introduced.

However, existing methods discussed in the foregoing often involve an unwanted mode change occurring naturally when a conventional input activity using a pen is conducted. Accordingly, there is a need for a terminal interaction method using an object such as a pen, as a gesture easily distinguishable from a conventional pen input activity.

SUMMARY

Therefore, an object of the present disclosure is to provide a user terminal interaction method using a magnetic field without requiring a separate power source.

The present disclosure provides a method and apparatus that induces a magnetic field strength change when a user touches a user terminal and effectively senses a strength and a location of the user touch based on the induced magnetic field strength change. In particularly, advantageously, the present disclosure allows a magnetic sensor equipped in a conventional terminal, thereby eliminating the need for a separate magnetic sensor in a body of the terminal, and does not need to generate an electrical signal because of using the magnetic field strength. Also, in an exemplary embodiment of the present disclosure, a pen spinning gesture that can be easily distinguished from a conventional pen input activity may be used as a new input vocabulary. Since a gesture made intuitively for an object such as a pen using a finger of a user is used as another terminal control command parameter, a range of control commands using a pen may be significantly expanded. Further, because a range of the gestures includes various parameters, for example, a speed and a direction of the pen and a number of successive spins, and the like, there is an effect of broadening the terminal control parameters.

BRIEF DESCRIPTION OF THE DRAWINGS

The above and other objects, features and advantages of the present disclosure will become apparent from the following description of certain exemplary embodiments given in conjunction with the accompanying drawings, in which:

FIG. 11 shows an algorithm in which a gesture can be identified using only a speed based on a result that pen spinning is distinguished from a pen use activity using Naive Bayes according to an exemplary embodiment;

FIG. 12 is a flowchart illustrating a method of controlling a user terminal according to an exemplary embodiment;

FIGS. 43 through 45 are diagrams illustrating a method of sensing a touch strength in a horizontal direction according to an exemplary embodiment; and FIG. 46 is a diagram illustrating a change in relative location between a magnetic sensor and a magnet in response to a touch in a horizontal direction.

DETAILED DESCRIPTION OF EMBODIMENTS

Figure 1:
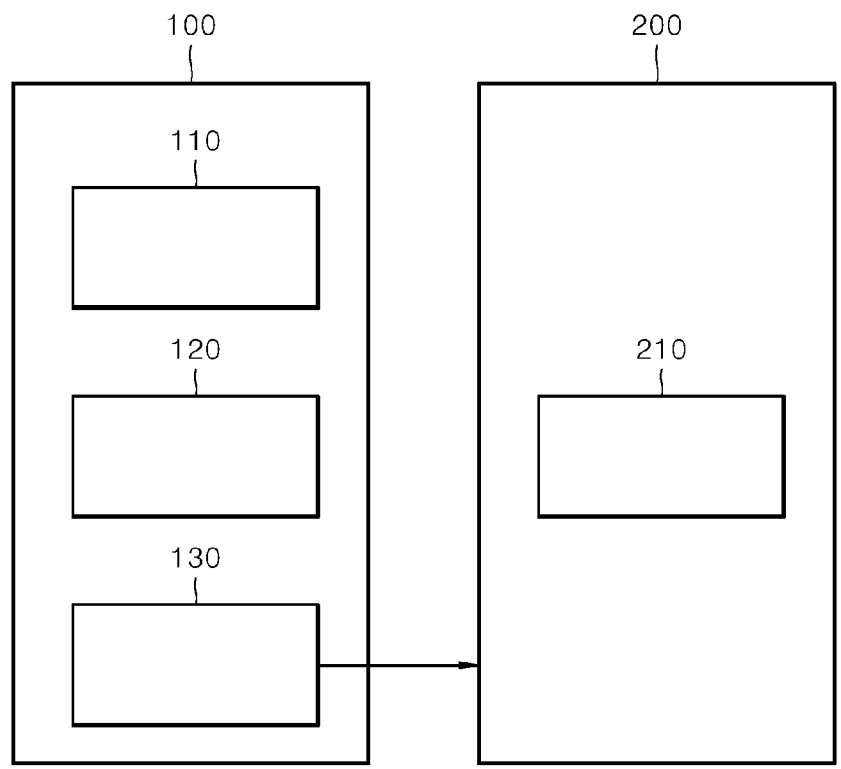
FIG. 1 is a schematic diagram illustrating a system for controlling a user terminal according to an exemplary embodiment.

Hereinafter, a method and apparatus for controlling a user terminal based on a magnetic field according to exemplary embodiments will be described in detail with reference to the accompanying drawings.

The following embodiments are provided to assist in a comprehensive understanding of the present disclosure, and not intended to limit the scope of this disclosure. Accordingly, equivalents performing the same function as the present disclosure will fall the scope of the present disclosure.

Various parts or elements in the drawings are designated by reference numerals, and the same drawing reference numerals are used for the same elements even in different drawings. Also, in the following description, well-known functions or constructions are not described in detail since they would obscure the present disclosure with unnecessary detail.

It will be understood that, although the terms first, second, A, B, (a), (b), etc. may be used herein to describe various elements, these terms are only used to distinguish one element from another, and the essence or an order or sequence of corresponding elements should not be limited by these terms. It will be understood that when an element is referred to as being "connected" or "coupled" to another element, it may be directly connected or coupled to each other or intervening elements may be "connected" or "coupled" to each element.

To overcome the limitations of a conventional art discussed in the foregoing, that is, a limited range of terminal control commands using an object such as a pen and a failure to recognize a gesture made intuitively by a user when the user uses a conventional pen, the present disclosure uses a gesture of manipulating a pen with a finger of a user as a gesture of determining a control command of a user terminal.

FIG. 1 is a schematic diagram illustrating a system for controlling a user terminal according to an exemplary embodiment.

Referring to FIG. 1, the system for controlling a user terminal according to an exemplary embodiment includes an object 100 having a shape of spinning in human fingers, preferably, a shape of a rod, and a user terminal 200 spaced away from the object 100. The object 100 includes a sensing unit 120 to sense a parameter that changes with the spin of the object, and the parameter include, for example, a magnetic field, an acceleration, and the like. The sensing unit senses a change in magnetic field or acceleration occurring in response to a motion of a pen, in particular, a motion conducted by a pen after being held between fingers, and a control command for the terminal is determined based on a value of the sensed change in magnetic field or acceleration.

In another exemplary embodiment, a parameter generating unit 110 may be further provided to generate a parameter, for example, a magnetic field, that changes with a physical motion of the object, for example, the spin of the object. For example, the parameter generating unit may be a permanent magnet or an electromagnet, and particularly, an electromagnet using a solenoid may transmit a state of the object to the user terminal such as a mobile phone, based on a frequency.

In a case in which an acceleration corresponds to the parameter, there is no need for a separate parameter generating unit because acceleration is automatically generated during rotation, but to sense the motion, an acceleration sensor may be provided as a sensing unit inside the rod-shaped object such as a pen.

In a case of the pen according to the present disclosure, a communication unit 130 may be further provided to transmit a sensing value obtained by the sensing unit such as an acceleration sensor or a magnetic sensor to the user terminal, and thus, the parameter generated in response to the spinning motion, that is, the sensing value of the sensing unit is transmitted to the user terminal through the communication unit.

The user terminal 200 further includes a control unit 210 to generate a control command for controlling the user terminal using the sensing value based on the motion pattern.

In an exemplary embodiment, the object is a pen and the motion is a motion by a gesture of spinning the pen with fingers. Accordingly, the spinning gesture according to an exemplary embodiment is a gesture of spinning the pen after the pen is held between fingers, and this gesture is not considered in conventional pen-based terminal control. However, the present disclosure found that a spinning gesture by fingers is intuitive to use, and in a case in which a magnetic sensor is used, can be recognized correctly.

Figure 2:
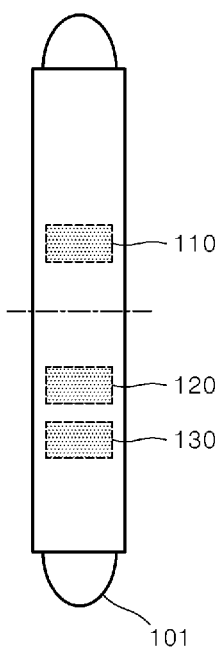
FIG. 2 is a cross-sectional view illustrating a pen as an object according to an exemplary embodiment.

FIG. 2 is a cross-sectional view illustrating a pen as an object according to an exemplary embodiment.

Referring to FIG. 2, the pen 100 includes a tip 101 provided at each end, a sensing unit 110 equipped in the pen 100, and if necessary, a communication unit 120 and a battery 130. If a sensing parameter that changes with a motion is a magnetic field, a magnet may be provided at the tip 101. Also, the sensing unit 110 may be a Gyroscope, an acceleration sensor, or a magnetic sensor based on a parameter type, and preferably, the motion sensing unit 110 may be placed at a biased location with respect to a center of the pen, in particular, a location close to an end, to accurately sense a change in a direction of the pen.

Figure 3:
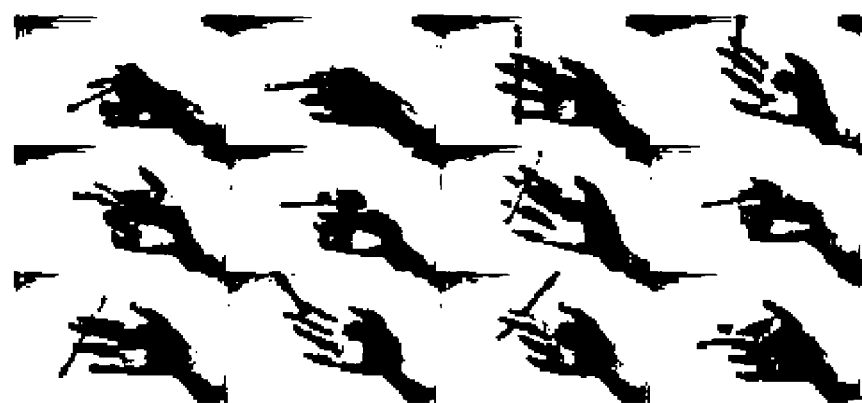
FIGS. 3 through 5 are photographs illustrating an object spinning gesture pattern according to an exemplary embodiment.
Figure 4:
Figure 5:
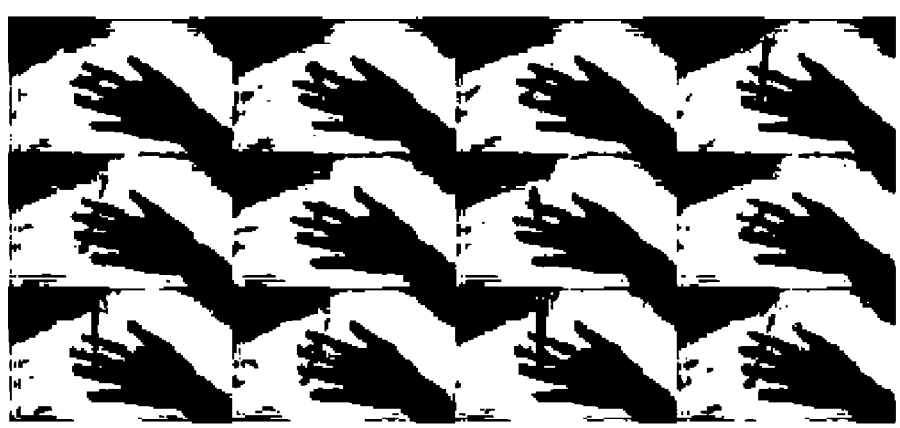

FIGS. 3 through 5 are photographs illustrating an object spinning gesture pattern according to an exemplary embodiment.

Referring to FIGS. 3 through 5, various spinning gestures may be made by fingers, and may include a gesture of spinning a pen twice by twisting fingers, a gesture of spinning a pen at a same position, and a gesture of shaking a pen. These gestures are identified based at least one parameter among a number of times, a direction, a length, a speed, and a location.

Figure 6:
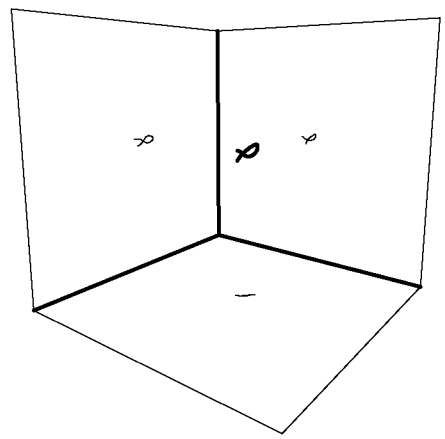
FIGS. 6 through 8 show a sensing result of a magnetic field generated in response to the gesture of FIGS. 3 through 5 using a magnetic sensor equipped in a pen.
Figure 7:
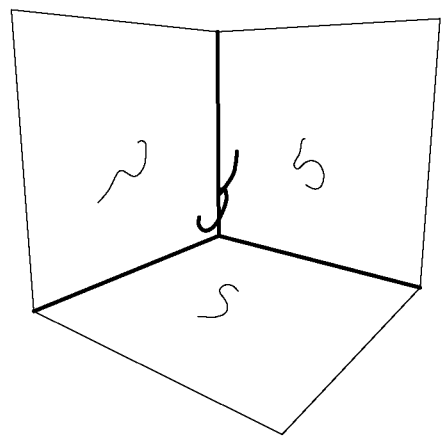
Figure 8:
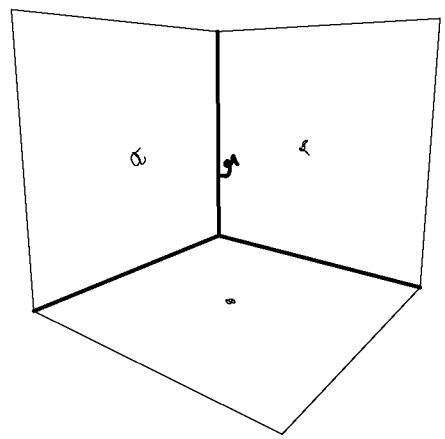

FIGS. 6 through 8 show a sensing result of a magnetic field generated in response to the gesture of FIGS. 3 through 5 using a magnetic sensor equipped in a pen.

Referring to FIGS. 6 through 8, it is found that a sensing value of a 3-axis magnetic sensor varies in pattern and location based on a gesture.

In the present disclosure, various factors described below may be considered as a criterion for determining a finger gesture for the pen, however the present disclosure is not limited in this regard.

Avg_speed—an average speed of a change vector

Std_speed—a speed standard deviation (STD) of a change vector

Area_abc—a volume of a cube including a gesture (a*b*c)

Curvedness—an extent to which a trajectory is curved

Area_ab, Area_bc, Area_ac—an area of each side of a cube including a gesture (a*b), (b*c), (a*c)

Ratio_ab, ratio_bc, ratio_ac—a ratio of a cube including a gesture (a/b), (b/c), (a/c)

Figure 9:
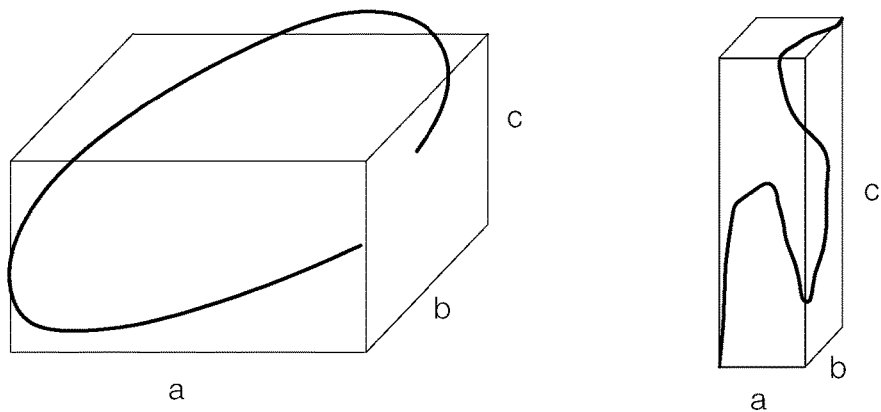
FIG. 9 is a diagram illustrating an embodiment in which a gesture pattern is analyzed using a volume of a cube including a gesture according to an exemplary embodiment.

FIG. 9 is a diagram illustrating an embodiment in which a gesture pattern is analyzed using a volume of a cube including a gesture according to an exemplary embodiment.

Referring to FIG. 9, magnetic field sensing value trajectories obtained from each gesture have different volumes of cubes including the gestures, and may be used to identify a spinning gesture using the volume of the cube as one factor.

Figure 10:
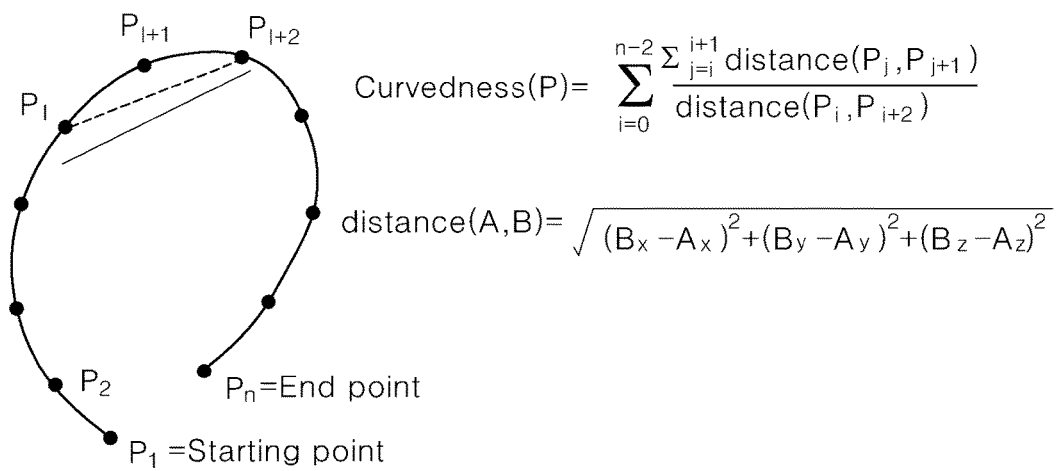
FIG. 10 is a diagram illustrating an embodiment in which a gesture pattern is analyzed using a curvedness of a trajectory according to an exemplary embodiment, in which Equations 1 and 2 are for calculating the curvedness.

FIG. 10 is a diagram illustrating an embodiment in which a gesture pattern is analyzed using a curvedness of a trajectory according to an exemplary embodiment, in which Equations 1 and 2 are for calculating the curvedness.

Referring to FIG. 10, curvedness represents an extent of being curved in comparison to a shortest distance straight line, and the higher curvedness, the more curved. In an exemplary embodiment, a spinning gesture by fingers may be accurately identified based on a curvedness of a magnetic field sensing value trajectory.

In an exemplary embodiment, a gesture can be identified using only a speed based on a result that pen spinning is distinguished from a pen use activity using Naive Bayes, and this is shown in an algorithm of FIG. 11.

Referring to FIG. 11, each gesture can be identified using only a speed at a degree of accuracy of 98% or higher. In the present disclosure, when an object such as a pen spins with fingers, a speed, a direction, and an angle are different for each gesture, and a magnetic field sensed therefrom has different trajectory patterns.

Further, in another exemplary embodiment, a permanent magnet requiring no separate power source such as a battery may be equipped in a separate control means for controlling a user terminal, so that the user terminal may be controlled in various manners only by a pen spinning gesture using fingers. Here, the control command includes a variety of input commands and manipulation commands for the user terminal.

FIG. 12 is a flowchart illustrating a method of controlling a user terminal according to an exemplary embodiment using the control device described in the foregoing.

Referring to FIG. 12, first, a physical parameter is generated in response to a spinning gesture of an object (S110). Subsequently, the physical parameter is sensed by a user terminal or an object, and a control command signal for the user terminal is generated based on the sensed physical parameter pattern (S120). In the present disclosure, the object may be an object in a shape of a rod that can be held between fingers of a user, the spinning gesture may be a spinning gesture of the object by a finger motion of the user, and the physical parameter may be an acceleration, a magnetic field, or a combination thereof. In the present disclosure, the physical parameter pattern may correspond to a spinning gesture pattern determined by at least one of a number of times, a direction, a length, a speed, and a location of the spinning gesture, and accordingly, various control commands may be executed based on rotation by the spinning gesture on fingers.

To solve the problems discussed in the foregoing, the present disclosure generates a magnetic field (active magnetic field) directly from a pen, and determines a location (including a distance) of the pen relative to the user terminal in contact with or close to the pen, based on a strength and a direction of the generated magnetic field. Accordingly, the pen as a control means may be easily identified by changing the frequency of the magnetic field and the like, and the location of the pen may be accurately inferred by the user terminal from the sensed strength and direction of the active magnetic field. Also, a movement of the magnetic field changes based on a physical displacement of the pen, for example, a location, an orientation, a movement speed, a movement direction, or a movement vector of the pen. Accordingly, the present disclosure determines an interaction command based on a combination of a frequency crucial to determine a pen type and a magnetic field pattern crucial to determine a physical displacement of the pen, for example, a distance from the user terminal/a location relative to the user terminal, a direction/a spinning direction of the pen, a speed/an orientation of the pen.

Figure 13:
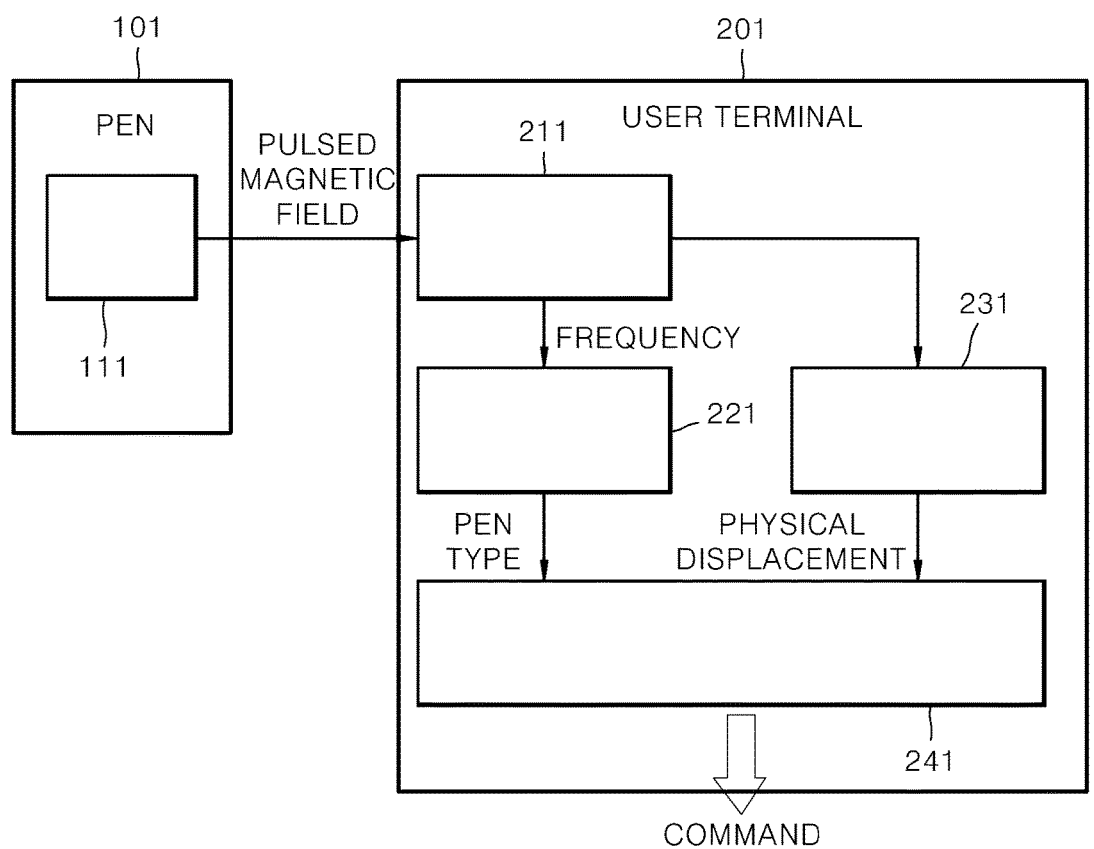
FIG. 13 is a block diagram illustrating a pen interaction system using a magnetic field according to an exemplary embodiment.

FIG. 13 is a block diagram illustrating a pen interaction system using a magnetic field according to an exemplary embodiment.

Referring to FIG. 13, the system includes a pen 101 equipped with a magnetic field generating unit 111 to generate a pulsed magnetic field. In the specification, the pen is equipped with a means for generating an active magnetic field, and corresponds to an input means spaced away from a user terminal such as a mobile phone or a tablet personal computer (PC).

The magnetic field generating unit 111 generates a magnetic field at a particular frequency dissimilar to a permanent magnet generating a constant magnetic field all the way, and may have a shape of a solenoid coil supplying a pulsed electric current therethrough. That is, in response to the pulsed electric current being supplied at a particular frequency, the solenoid coil also generates a magnetic field (pulsed magnetic field) at a frequency corresponding to the frequency of the electric current. The present disclosure identifies a location of the pen equipped with the magnetic field generating unit 111 based on the frequency of the pulsed magnetic field, so that a plurality of pens may be easily distinguished using a single magnetic sensor.

Accordingly, the interaction system having the function described in the foregoing includes a magnetic sensor 211 equipped in a user terminal 201 to sense the pulsed magnetic field from the pen 101, and a pen type determining unit 221 to determine a type of the pen 101 based on the frequency of the pulsed magnetic field sensed by the magnetic sensor 211. In an exemplary embodiment, the user terminal may include a touch screen, and in this case, the pen of the pulsed magnetic field may be identified based on a touch location of the touch screen with the pen and a matched pulsed magnetic field strength by comparing a strength of the pulsed magnetic field at the touch location of the touch screen with the pen to a strength of a pulsed magnetic field pre-stored for each touch location. That is, the pen interaction method according to an exemplary embodiment may implement various interactions of the pen by determining a movement pattern of the pulsed magnetic field based on the touch location of the touch screen, and selectively combining the frequency, the strength, and the movement pattern of the pulsed magnetic field.

Further, the interaction system according to the present disclosure may further include a physical displacement determining unit 231 to determine a physical displacement of the pen based on the movement pattern of the pulsed magnetic field sensed by the magnetic sensor 211. That is, in the present disclosure, the magnetic field sensed by the magnetic sensor has two functions: a function of verifying an identification (ID) of the pen based on a frequency, and a function of determining the physical displacement of the identified pen based on the magnetic field pattern. For example, when the pen moves away from the user terminal, that is, when the pen moves away from the sensor, the strength of the magnetic field will reduce, and on the contrary, when the pen gets close to the user terminal, the strength of the magnetic field will increase. Since the movement pattern of the pulsed magnetic field being sensed is changed based on the physical displacement of the pen, for example, a location, a distance, an orientation, a direction, a movement speed, and a movement direction, the present disclosure infers the physical displacement of the pen using this.

For example, the magnetic field pattern may be any one of a change speed of a magnetic field vector, a speed standard deviation of the magnetic field vector, a volume of a cube occupied by a magnetic field pattern trajectory, a curvedness of the magnetic field pattern trajectory, an area of each side of the cube occupied by the magnetic field pattern trajectory, and a strength of the magnetic field, however any parameter that changes with at least a change in the physical displacement of the pen may fall within a range of the magnetic field pattern according to the present disclosure.

Also, the physical displacement may be measured for each of a plurality of pens, and the displacement of the pulsed magnetic field per pulse frequency for each pen may be measured through fast Fourier transform (FFT).

The interaction system according to the present disclosure includes a command unit 241 to determine a control command for the user terminal based on the pen type determined by the pen type determining unit 221 and the physical displacement of the pen determined by the physical displacement determining unit 231. That is, in a case in which the frequency is different, different control commends may be determined even though the physical displacement, for example, a spinning direction or a location is the same. Accordingly, only in a case in which both the frequency and the physical displacement are the same, the same control command may be executed, and thereby, the user terminal may be controlled using the pen at a high degree of freedom.

The user terminal according to an exemplary embodiment includes a touch screen. Accordingly, although a same location touch is done on the user terminal by the pen, a different control or input command may be executed when the pen type determined based on the frequency is different.

Figure 14:
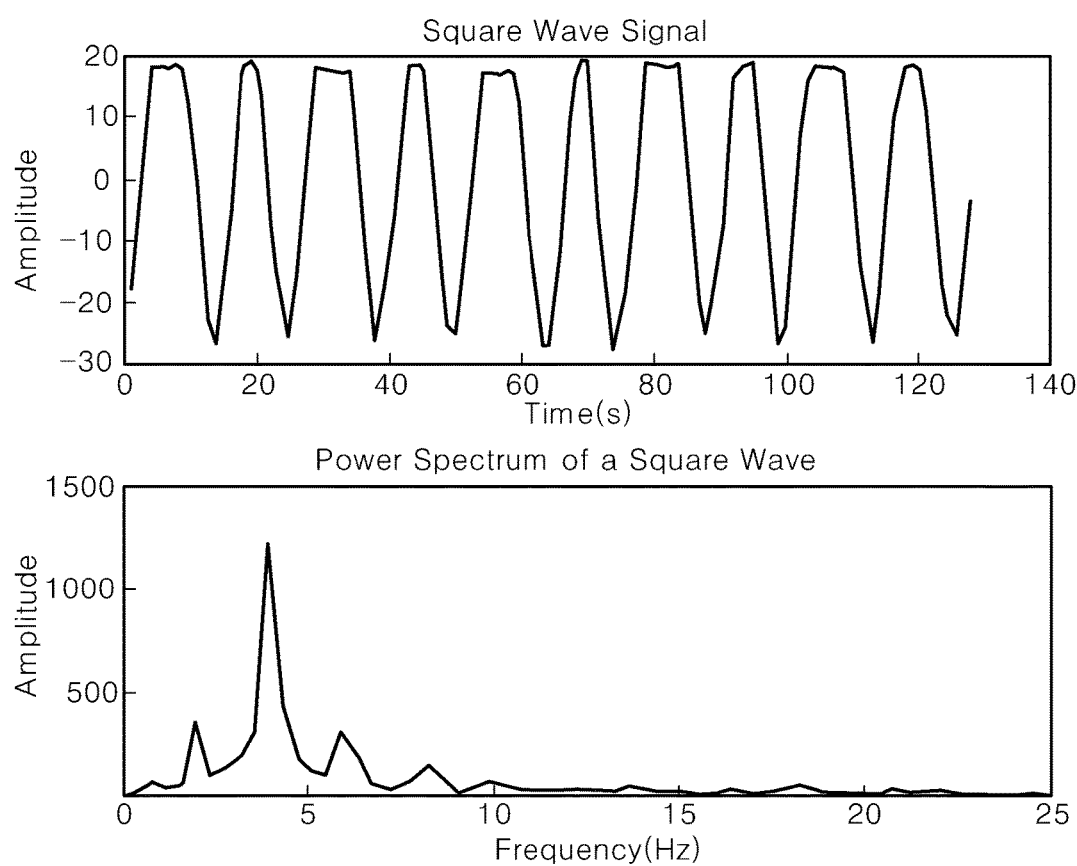
FIGS. 14 through 15 show a result obtained by sensing a pulsed magnetic field using a magnetic sensor according to an exemplary embodiment and a result obtained through a bandpass filter after performing FFT-processing on the sensing result (the magnetic field strength over time) and converting the strength for each frequency domain.
Figure 15:
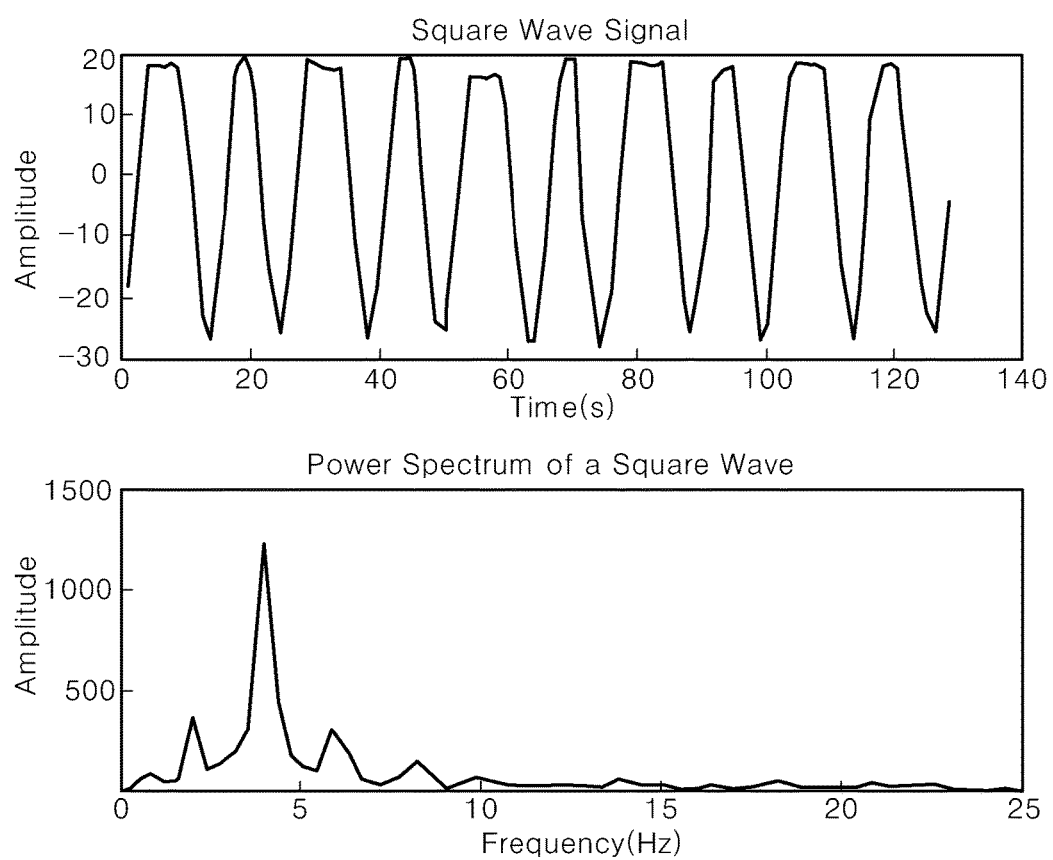

FIGS. 14 and 15 show a result obtained by sensing a pulsed magnetic field using a magnetic sensor according to an exemplary embodiment and a result obtained through a bandpass filter after performing FFT-processing on the sensing result (the magnetic field strength over time) and converting the strength for each frequency domain.

Referring to FIGS. 14 and 15, it is found that a magnetic field strength based on a frequency may be effectively sensed. Also, the sensed magnetic field strength may be plural depending on characteristics of a sensing unit, and for example, in a case of a 3-axis sensor, the magnetic field strength may be extracted along each of an x-axis, a y-axis, and a z-axis.

Further, another exemplary embodiment provides an embodiment in which a pulsed magnetic field having different frequencies from a plurality of pens may be concurrently sensed by a single magnetic sensor.

Figure 16:
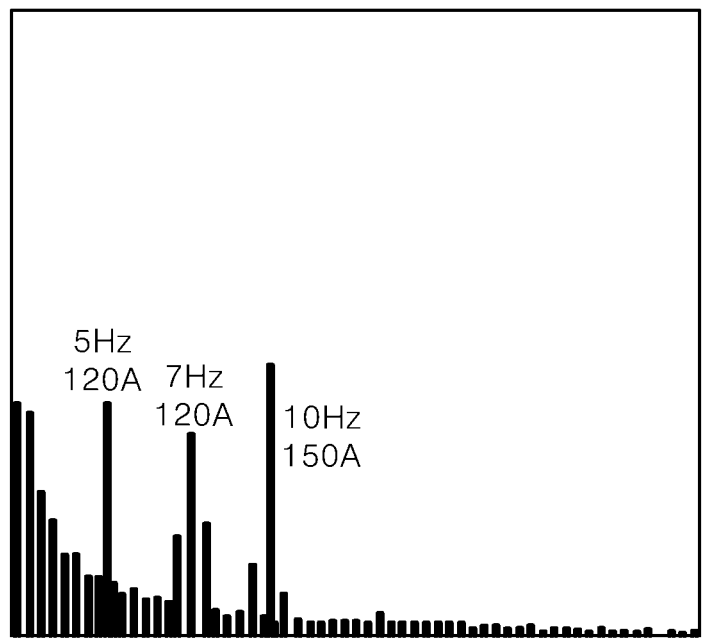
FIGS. 16 through 17 are diagrams illustrating a frequency-per magnetic field strength sensed by a single sensor equipped in a user terminal from a pulsed magnetic field having different frequencies of 5 Hz, 7 Hz, and 10 Hz corresponding to a magnetic field generated from each of a plurality of pens, and a result obtained by filtering the frequency-per magnetic field strength through a bandpass filter.
Figure 17:
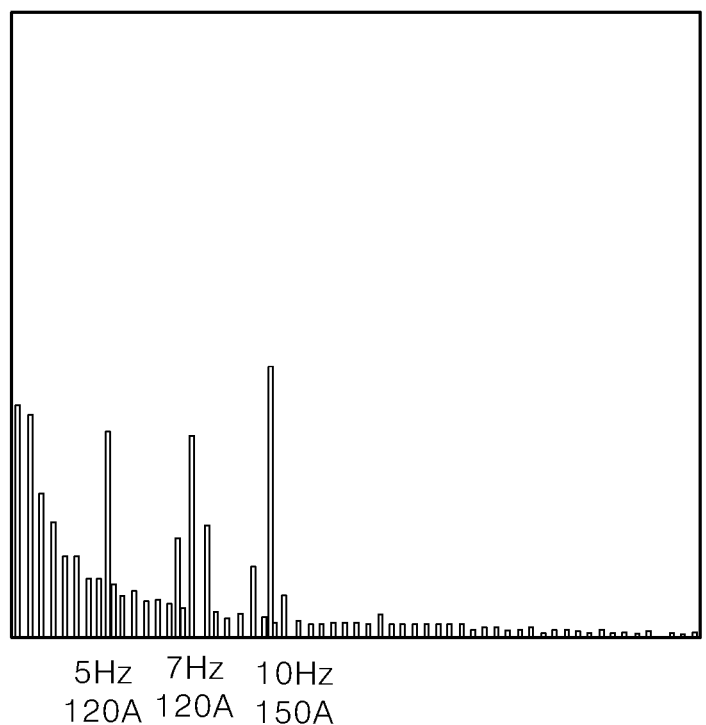

FIGS. 16 and 17 are diagrams illustrating a frequency-per magnetic field strength sensed by a single sensor equipped in a user terminal from a pulsed magnetic field having different frequencies of 5 Hz, 7 Hz, and 10 Hz corresponding to a magnetic field generated from each of a plurality of pens, and a result obtained by filtering the frequency-per magnetic field strength through a bandpass filter.

Referring to FIGS. 16 and 17, it is found that the magnetic field strength is effectively sensed for each frequency, 5 Hz, 7 Hz, and 10 Hz. Particularly, the present disclosure may identify a pen type from the magnetic field strength sensed for each frequency using a single sensor, and also effectively identify a distance between a pen and a terminal.

Figure 18:
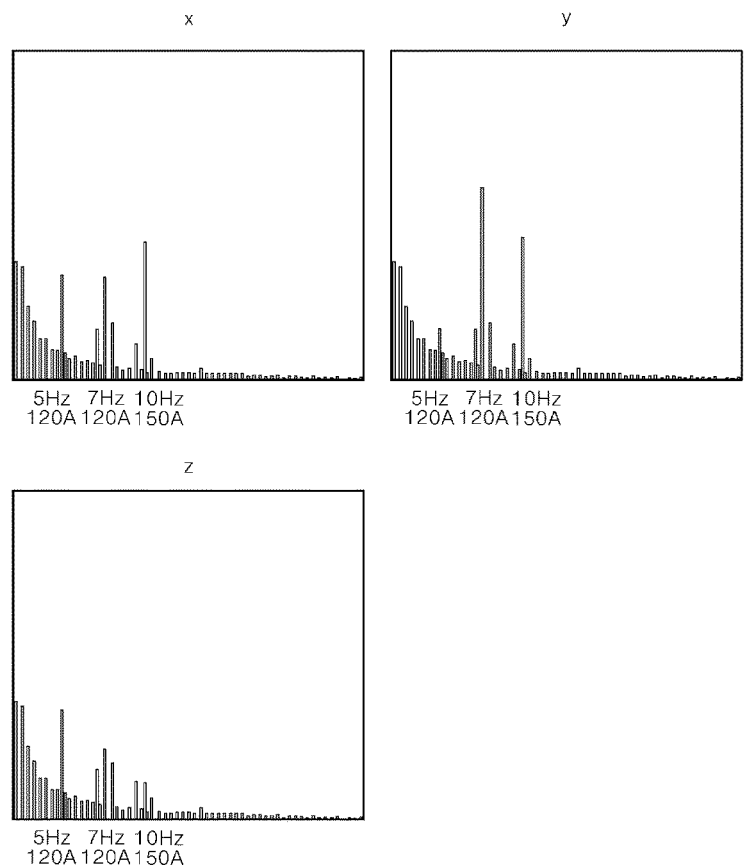
FIG. 18 shows a result obtained by sensing a magnetic field strength based on a frequency, using a single 3-axis sensor equipped in a user terminal, from a pulsed magnetic field having different frequencies of 5 Hz, 7 Hz, and 10 Hz corresponding to a magnetic field generated from each of a plurality of pens, and the result corresponds to a result obtained by bandpass-filtering the magnetic field in each axis.

FIG. 18 shows a result obtained by sensing a magnetic field strength based on a frequency, using a single 3-axis sensor equipped in a user terminal, from a pulsed magnetic field having different frequencies of 5 Hz, 7 Hz, and 10 Hz corresponding to a magnetic field generated from each of a plurality of pens, and the result corresponds to a result obtained by bandpass-filtering the magnetic field in each axis.

Referring to FIG. 18, a sensor having a plurality of axes may sense a magnetic field strength for each frequency corresponding to each axis, and through this, a direction and a strength of the magnetic field may be extracted concurrently for each of a plurality of particular frequencies.

Figure 19:
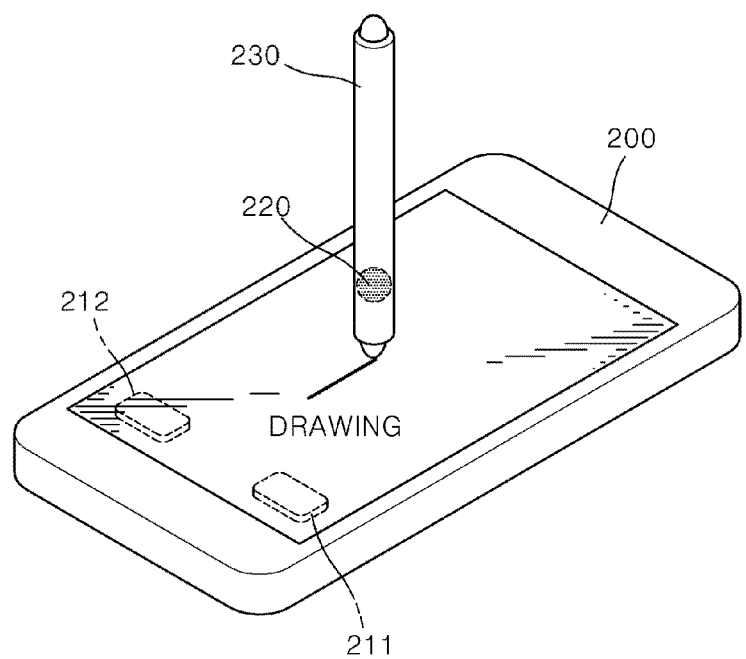
FIGS. 19 through 20 are diagrams illustrating a method of controlling a user terminal according to an exemplary embodiment.
Figure 20:
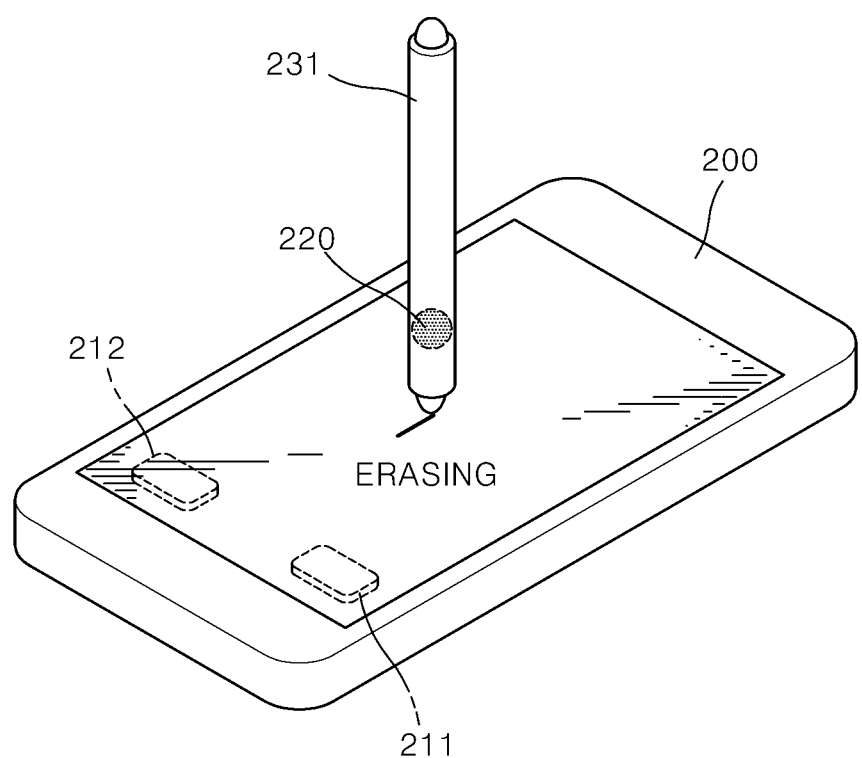

FIGS. 19 and 20 are diagrams illustrating a method of controlling a user terminal according to an exemplary embodiment.

Referring to FIGS. 19 and 20, an embodiment is illustrated in which a drawing function is performed by touching a touch screen of a user terminal 200 with a first pen 230 having a first frequency. Referring to FIG. 19, the user terminal 200 includes a magnetic sensor 211, and a pen type determining unit 212 to determine a pen type based on a frequency of a pulsed magnetic field sensed by the magnetic sensor.

However, as shown in FIG. 20, an erasing function, but not a drawing function, is performed when a touch is performed using a second pen 231 at the same location as the first pen, and this difference in command is resulted from a frequency difference between the first pen and the second pen.

Figure 21:
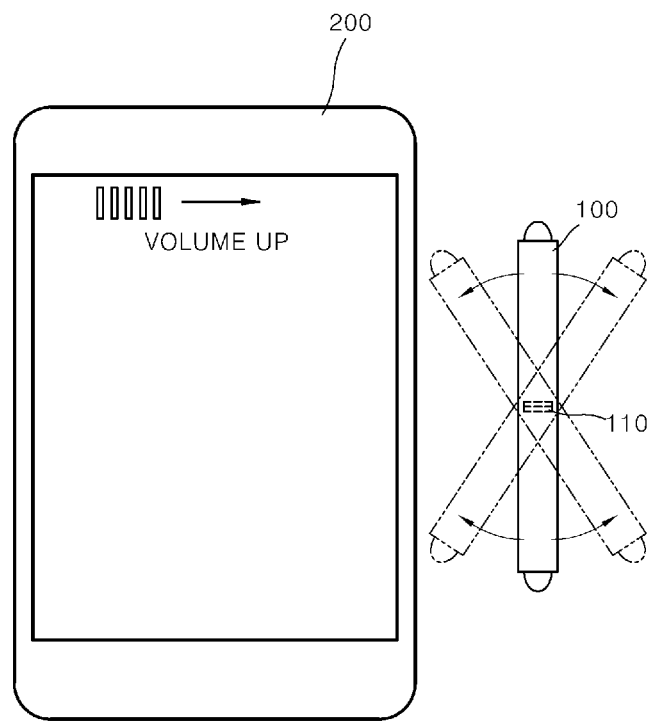
FIGS. 21 through 22 are diagrams illustrating an embodiment in which a control command for a user terminal is executed based on a location and a motion pattern of a pen.
Figure 22:
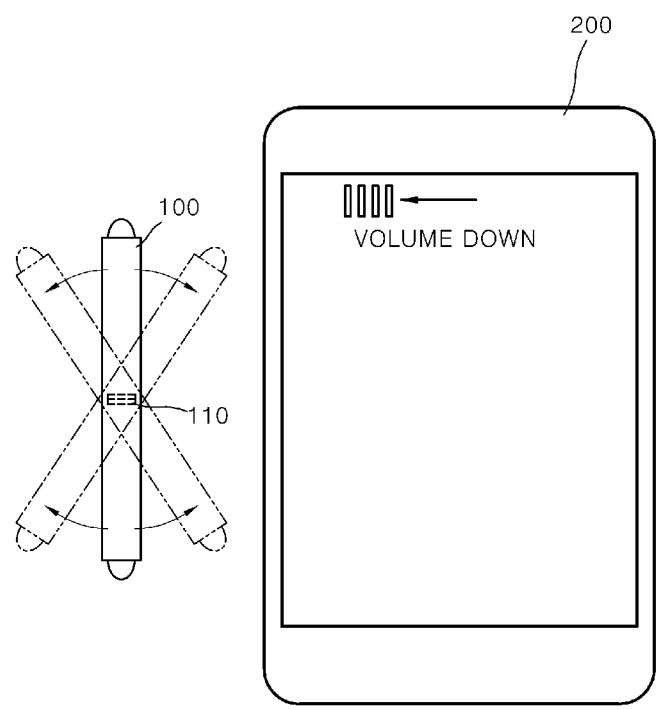

FIGS. 21 and 22 are diagrams illustrating an embodiment in which a control command for a user terminal is executed based on a location and a motion pattern of a pen.

Referring to FIGS. 21 and 22, an embodiment is illustrated in which a volume signal from the terminal is increased by a user shaking a pen in zigzags at a right side of a terminal. Particularly, in the present disclosure, a relative location of the pen to the terminal is determined based on a magnetic field pattern obtained by a magnetic sensor, and accordingly, more accurate and various terminal controls may be implemented by combining the relative location of the magnetic field and the gesture pattern.

FIG. 22 shows an embodiment in which a volume signal from the terminal is reduced by a user shaking a pen in zigzags at a left side of a terminal. When a user shakes another pen having a different frequency in the same manner as FIG. 21, a different command is executed based on a frequency type.

Figure 23:
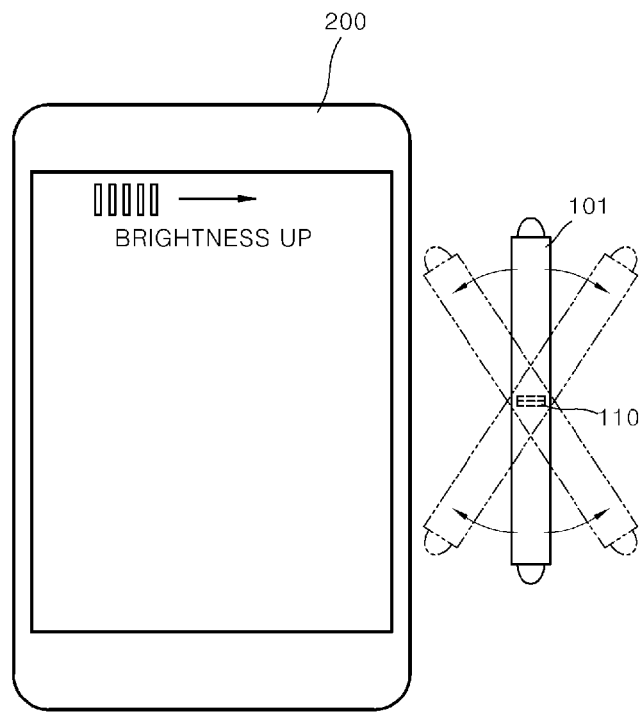
FIGS. 23 and 24 are diagrams illustrating an embodiment in which different commands are executed based on a location and a motion pattern of a pen.
Figure 24:
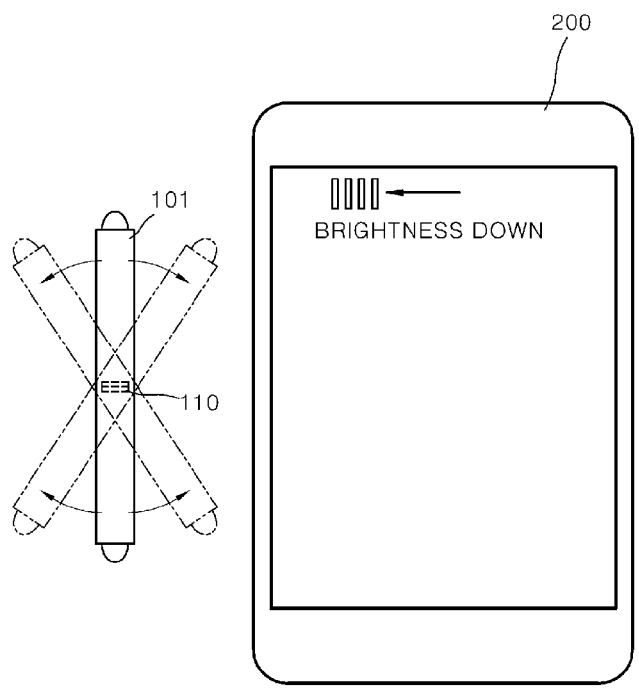

FIGS. 23 and 24 are diagrams illustrating an embodiment in which different commands are executed based on a location and a motion pattern of a pen.

Referring to FIGS. 23 and 24, brightness of a display of the terminal is increased or reduced by a user shaking the pen 101 having different frequencies at a left or right side of a terminal. Accordingly, even though a location and/or a motion pattern of the pen is the same, different terminal controls may be implemented when the frequency is different.

Figure 25:
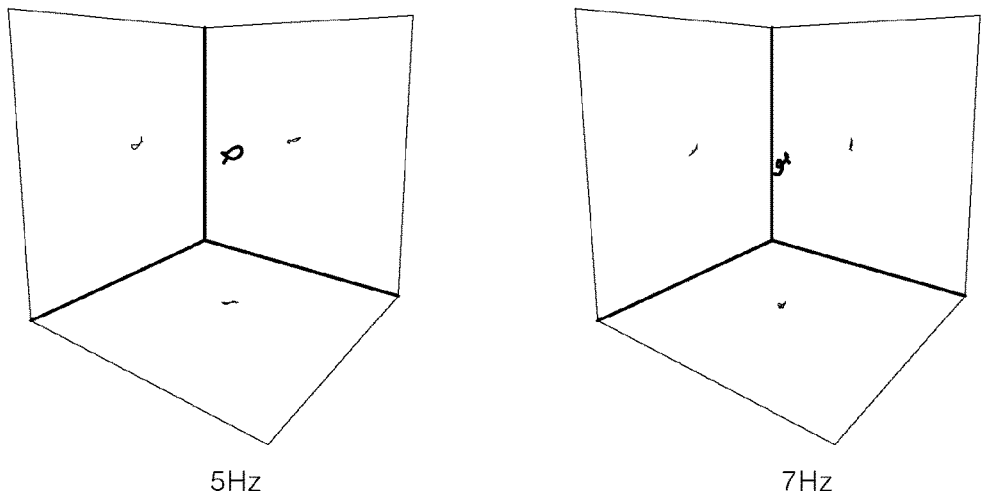
FIG. 25 shows a movement of a magnetic field strength for each frequency measured by a 3-axis sensor through an FFT method.

FIG. 25 shows a movement of a magnetic field strength for each frequency measured by a 3-axis sensor through an FFT method when a first pen 101 and a second pen 102 having different frequencies are rotated and shaken in zigzags at the same time.

Referring to FIG. 25, a method and apparatus for interaction according to the present disclosure may sense a magnetic field having different frequencies from a plurality of pens, and identify each pen from this. Also, physical displacements of the pens having different frequencies may be measured concurrently through this method, and accordingly, various interaction commands by the plurality of pens may be executed concurrently.

Also, the present disclosure provides a pen and a user terminal for use in the system, and a plurality of pens may be identified by the user terminal based on the frequency of the pen.

Further, the present disclosure provides an interaction method for the interaction system.

Figure 26:
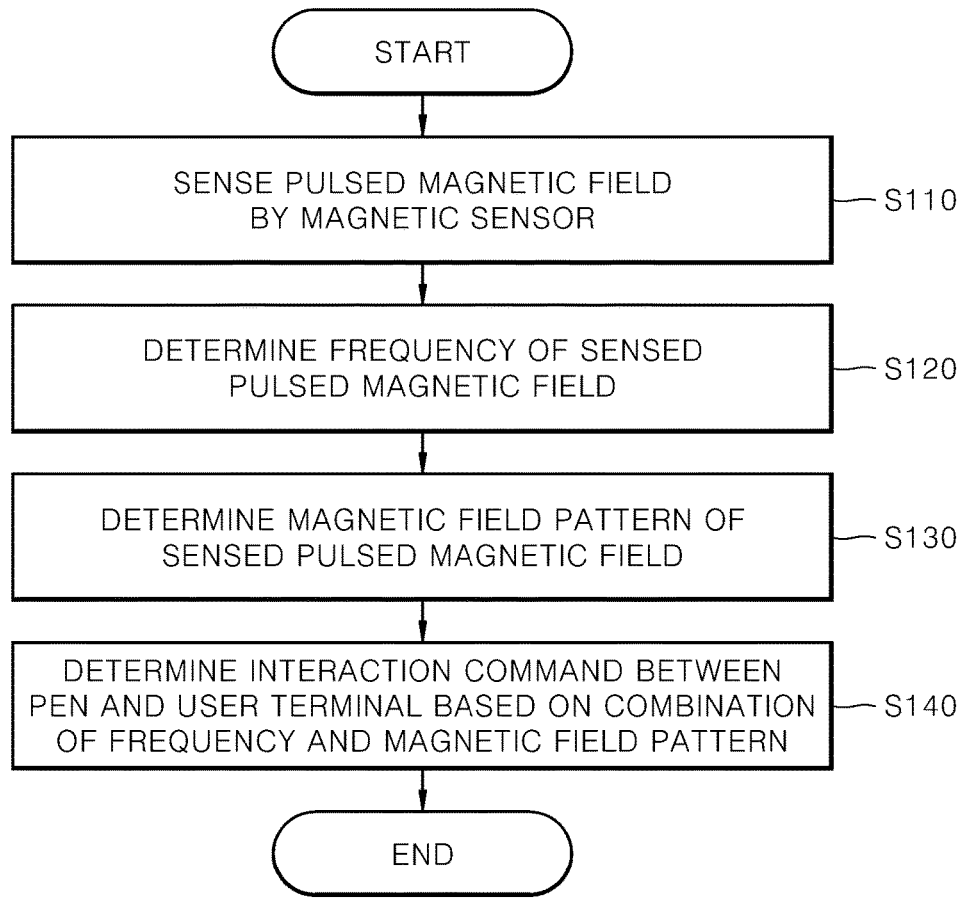
FIG. 26 is a flowchart illustrating a method for interaction between a pen and a user terminal according to an exemplary embodiment.

FIG. 26 is a flowchart illustrating a method for interaction between a pen and a user terminal according to an exemplary embodiment.

Referring to FIG. 26, the interaction method according to the present disclosure includes sensing a pulsed magnetic field, using a magnetic sensor equipped in a user terminal, from a pen equipped with a magnetic field generating unit to generate the pulsed magnetic field (S110); determining a frequency of the sensed pulsed magnetic field (S120); determining a magnetic field pattern of the sensed pulsed magnetic field (S130); and determining an interaction command between the pen and the user terminal based on a combination of the frequency and the magnetic field pattern (S140).

In an exemplary embodiment, the magnetic field pattern is a magnetic field parameter changing based on a location, an orientation, or a motion of the pen, and a result of the magnetic field pattern may be, for example, a magnetic field strength, a 3-axis value of a 3-axis magnetic sensor, and the like. Or, a physical displacement based on the motion of the pen may be determined based on a change speed of a magnetic field vector, a speed standard deviation of the magnetic field vector, a volume of a cube occupied by a magnetic field pattern trajectory, a curvature of the magnetic field pattern trajectory, and an area of each side of a cube occupied by the magnetic field pattern trajectory.

Particularly, in the pen interaction method using a magnetic field according to the present disclosure, the determining of the interaction command between the pen and the user terminal is performed concurrently on a plurality of pens having different frequencies, allowing a plurality of control commands to be executed concurrently in a single user terminal.

In the present disclosure, the control command for the user terminal is determined based on a combination of the physical displacement of the pen and the frequency of the pulsed magnetic field, and accordingly, dissimilar to a conventional art in which a command type is determined based on a touch of an unidentified pen, the control command for the user terminal according to an exemplary embodiment has different types based on a frequency generated from the pen, allowing various pen-based terminal interactions.

To solve the problem discussed in the foregoing, the present disclosure generates a magnetic field (active magnetic field) directly from an object such as a pen, and determines a location (including a distance) of the object relative to the user terminal in contact with or close to the object, based on a strength of the generated magnetic field. Accordingly, a control means may be easily identified by changing the frequency of the magnetic field and the like, and the location of the object such as a pen may be accurately inferred by the user terminal based on the sensed strength of the active magnetic field.

Figure 27:
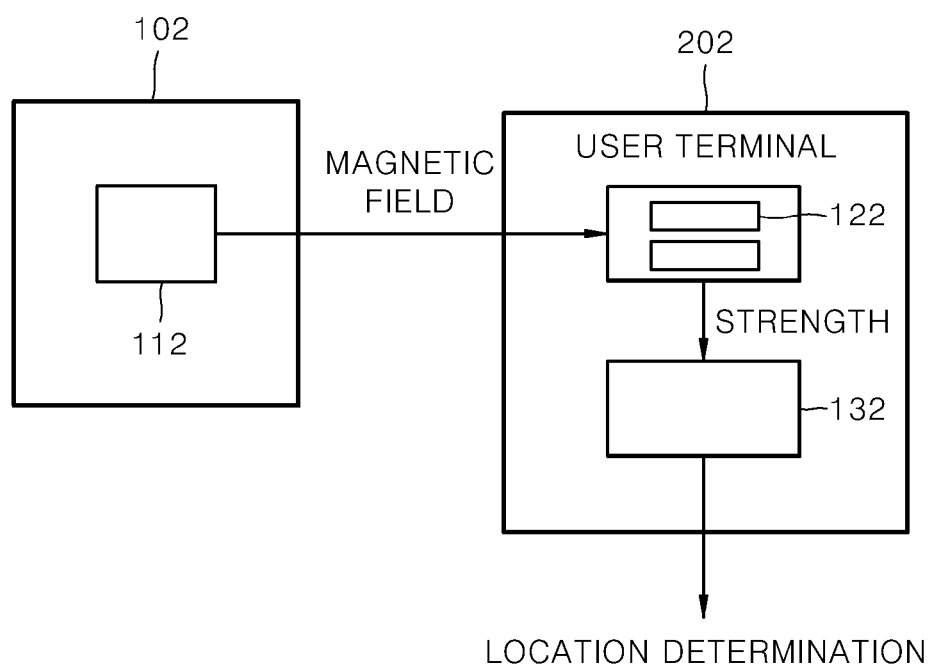
FIG. 27 is a block diagram illustrating a system for sensing an object using a plurality of magnetic sensors according to an exemplary embodiment.

FIG. 27 is a block diagram illustrating a system for sensing an object using a plurality of magnetic sensors according to an exemplary embodiment.

Referring to FIG. 27, the system includes an object 102 equipped with a magnetic field generating unit 112 to generate a magnetic field, at least two magnetic sensors 122 equipped in a user terminal to sense the magnetic field from the object, and a location determining unit 132 to determine a location of the object relative to the user terminal based on a strength of the magnetic field sensed by the at least two magnetic sensors. In the specification, the object includes a means for generating a magnetic field, and corresponds to an arbitrary subject spaced away from the user terminal such as a mobile phone or a tablet PC. For example, the object may be a pen for touch input of the user terminal having a touch screen. Also, the system for sensing an object according to another exemplary embodiment may further include a command unit 142 to determine an input or control command based on the determined location of the object.

In the present disclosure, the strength of the magnetic field sensed by, in particular, the at least two magnetic sensors may be changed based on a distance between the magnetic sensor and the object, that is, a location in which the magnetic field is generated, and the input location of the object is inferred and determined using a sum of the strengths sensed by the at least two sensors.

FIGS. 28 through 33 are diagrams illustrating a method of sensing an object (sensing a location) using a magnetic field sensed by at least two magnetic sensors according to an exemplary embodiment.

Figure 28:
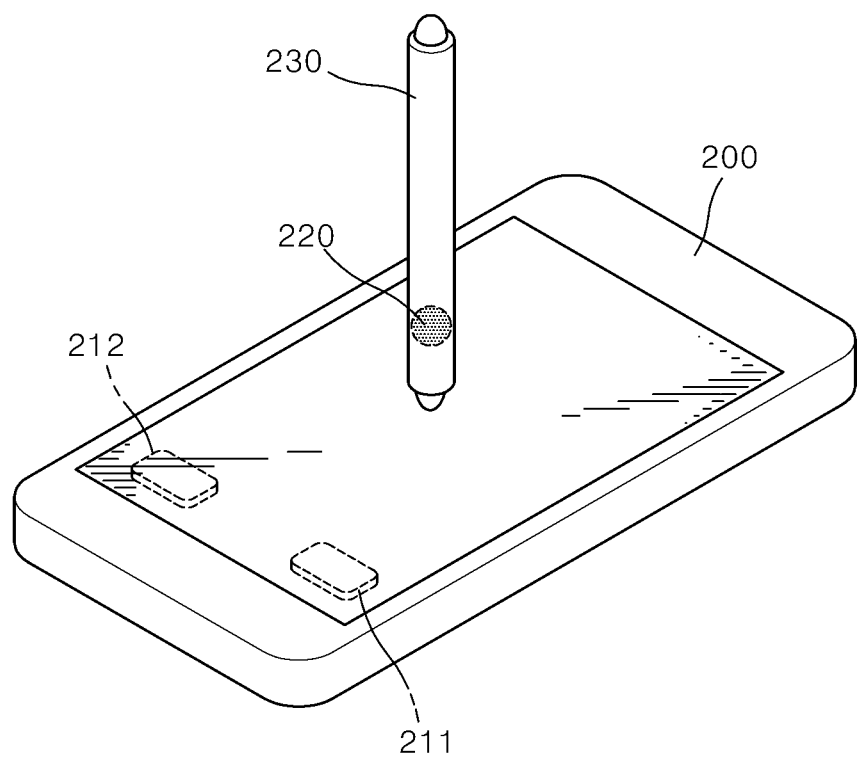
FIGS. 28 through 33 are diagrams illustrating a method of sensing an object (sensing a location) using a magnetic field sensed by at least two magnetic sensors according to an exemplary embodiment.

Referring to FIG. 28, two magnetic sensors 211 and 212 are equipped in a user terminal 200, and an object 230 (having a shape of a pen in FIG. 2) is provided outside of the user terminal 200 and includes a means 220 for generating a magnetic field, for example, a permanent magnet or an electromagnetic field generation circuit by an electric current.

Figure 29:
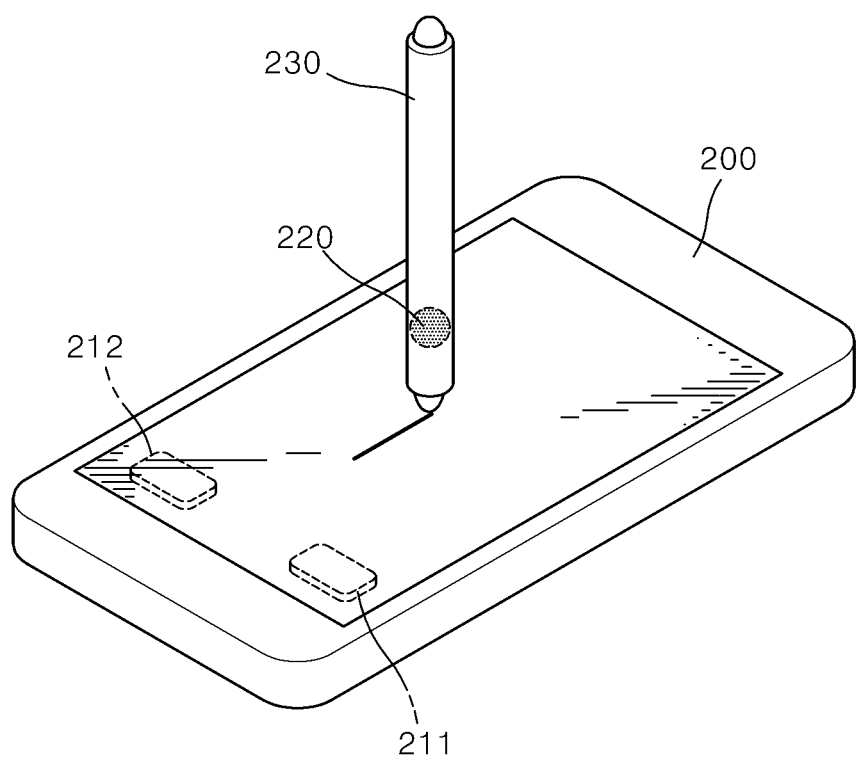

Referring to FIG. 29, as the object 230 moves closer to the user terminal 200, the magnetic field generated from the object is sensed by the at least two magnetic sensors and a strength of the magnetic field is extracted based on the sensing result. For example, in FIG. 30, one magnetic sensor 211 senses a magnetic field of a higher strength than the other magnetic sensor 212.

Figure 30:
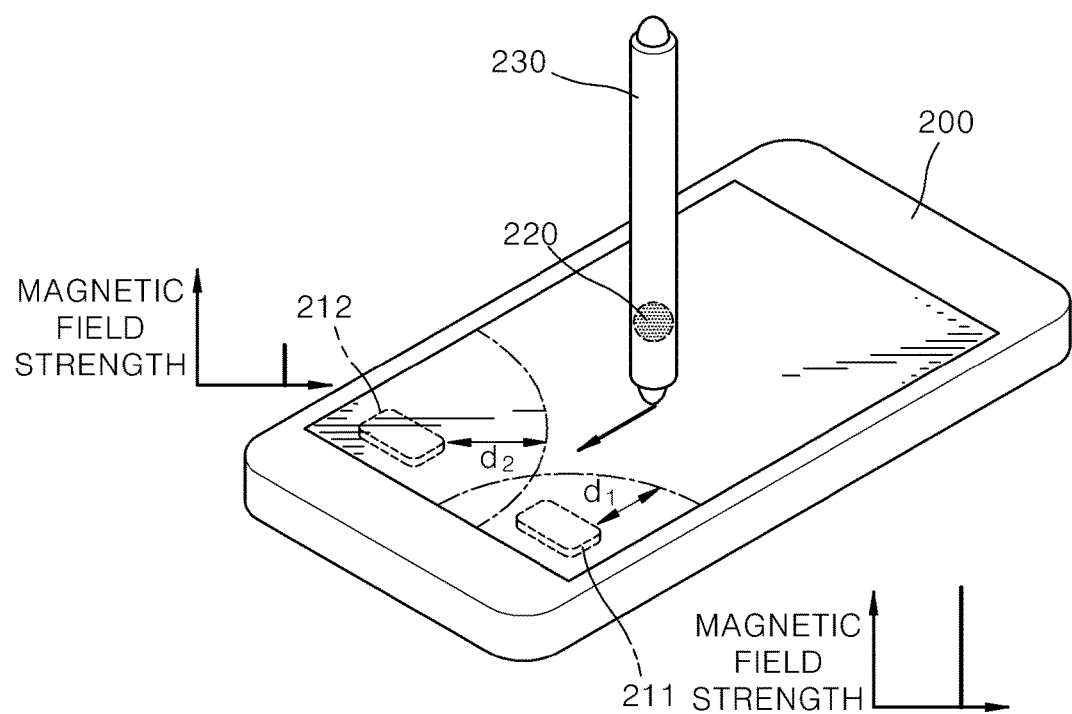

Referring to FIG. 30, a distance between the object 230 and each of the at least two magnetic sensors is calculated based on the sensed strength of the magnetic field, and the calculating of the distance between the magnetic sensor and the object may be determined based on a value stored in the user terminal (a distance relationship between the magnetic sensor and the object). In FIG. 30, a distance d1 from one sensor 211 and a distance d2 from the other sensor 212 are indicated based on the proximity of the object.

Figure 31:
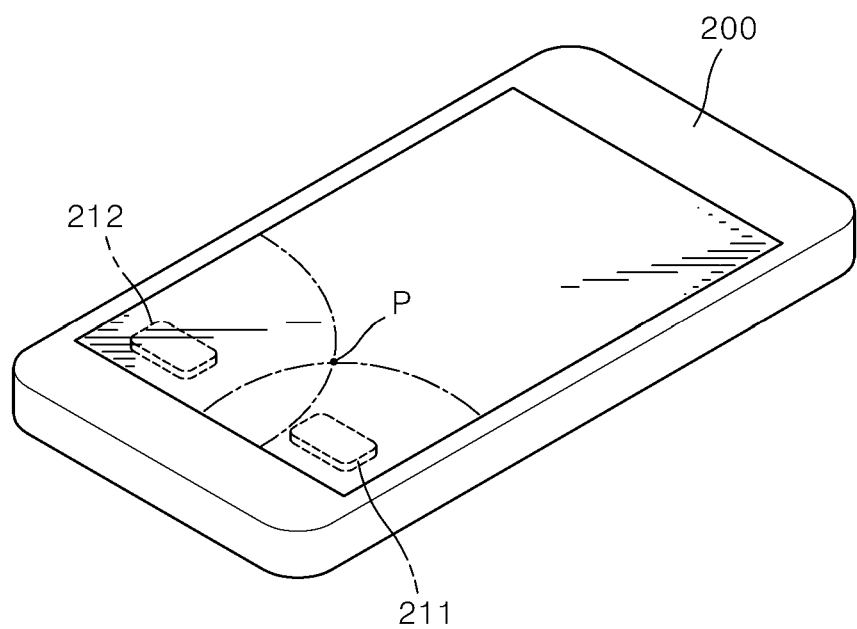

Referring to FIG. 31, an intersection point P of a circle representing the d1 and a circle representing the d2 is determined to be a location in which the object is sensed. That is, the present disclosure determines the intersection point, in which the distances calculated from each of the at least two magnetic sensors intersect, to be a location in which the object is actually placed, so that a correct location of the pen may be determined before a touch screen is actually touched with the pen. Further, in another exemplary embodiment, in a case in which there are at least two intersection points, an intersection point located in an area corresponding to an area of the touch screen may be preferentially determined to be an object location sensing result. Also, as a number of magnetic sensors increases, more accurate object location sensing may be implemented.

Figure 32:
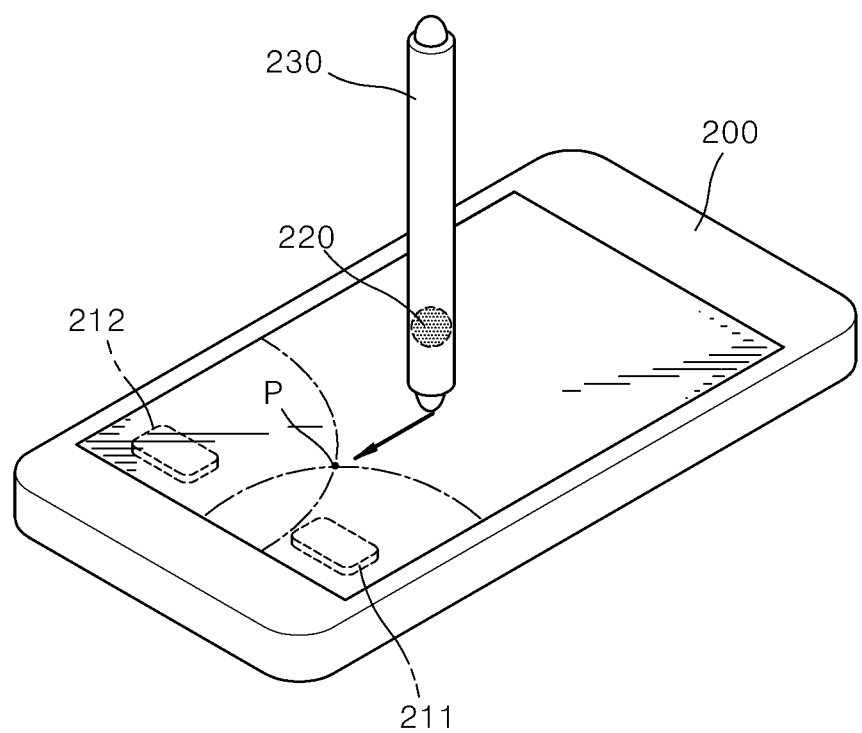
Figure 33:
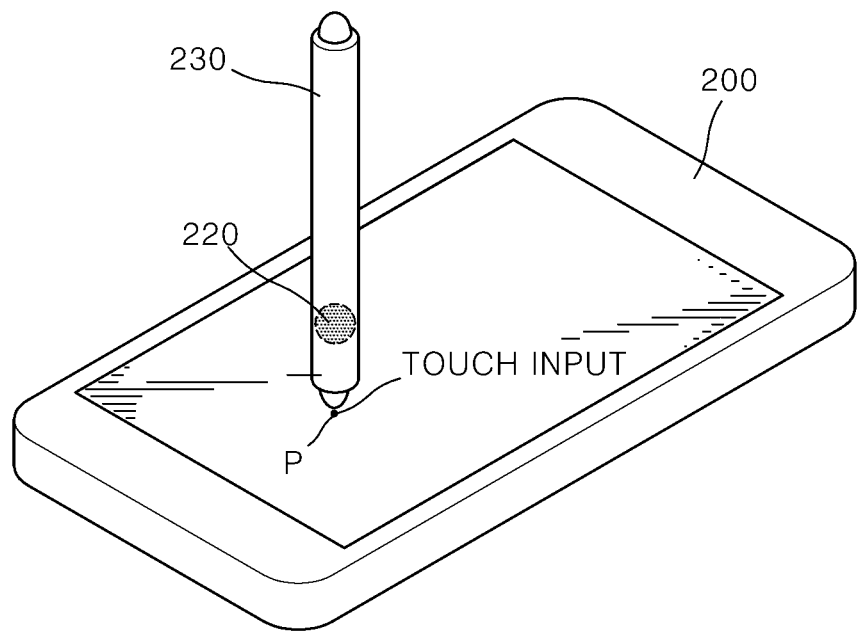

Referring to FIG. 32, when the strength of the magnetic field sensed by the at least two magnetic sensors is greater than or equal to a predetermined value, which implies the object stands in close proximity, the result of the determined location may be provided in advance on a display of the user terminal. Referring to FIG. 33, subsequently, a touch input is performed by touching the touch screen with the pen at the expected touch point P.

That is, as the user moves the pen closer to the touch screen to touch the touch screen, the strength of the magnetic field increases, and when the strength of the magnetic field is greater than or equal to a preset value, the expected touch location corresponding to the intersection point is provided in advance on the touch screen of the user terminal. Accordingly, a possibility of an incorrect input may be significantly reduced, and economical efficiency may be increased in comparison to a conventional art requiring a plurality of touch grid sensors. Further, various command signals for the user terminal may be generated before touched, and particularly, the present disclosure may provide a correct location in a state before being touched, that is, a hover state, only using two magnetic sensors when compared to a conventional art requiring a plurality of grid sensors.

Another exemplary embodiment provides a method and apparatus that induces a magnetic field strength change when a user touch is performed on a user terminal, and effectively senses a strength and a location of the user touch based on the induced magnetic field strength change, and will be described in more detail below.

Figure 34:
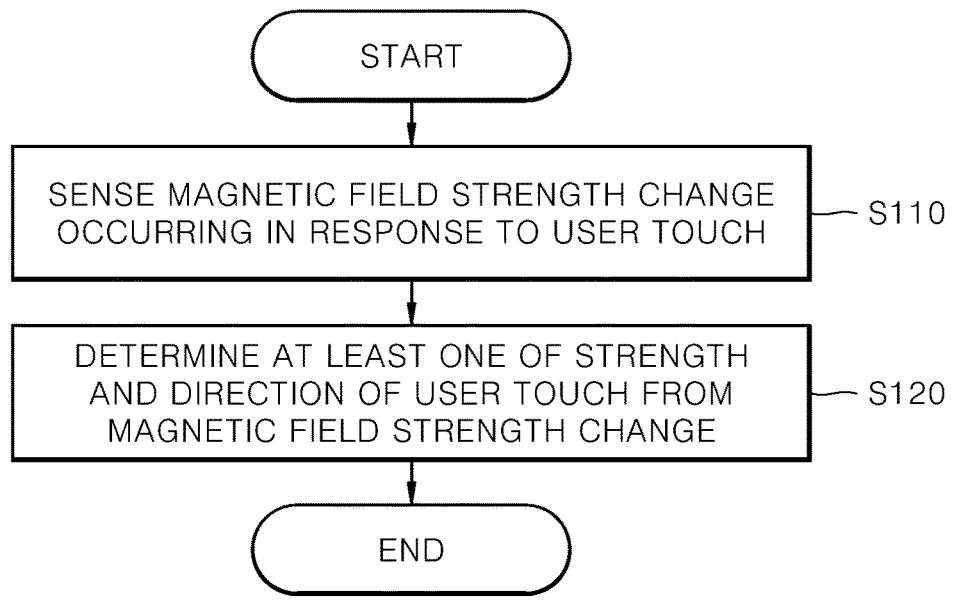
FIG. 34 is a flowchart illustrating a method of controlling a user terminal according to an exemplary embodiment.

FIG. 34 is a flowchart illustrating a method of controlling a user terminal according to an exemplary embodiment.

Referring to FIG. 34, the method of controlling a user terminal includes sensing a magnetic field strength change occurring in response to a user touch (S110), and determining at least one of a strength and a direction of the user touch of the user terminal based on the sensed magnetic field strength change (S120). That is, the present disclosure senses magnetic field lines generated from a magnet using a magnetic field strength sensing unit provided inside or outside of the user terminal, and determines whether a touch is performed and senses a strength of the touch, or a location of the touch based on the magnetic field strength change occurring in response to the user touch of the terminal.

Hereinafter, the method of controlling a user terminal according to the present disclosure is described in detail.

Figure 35:
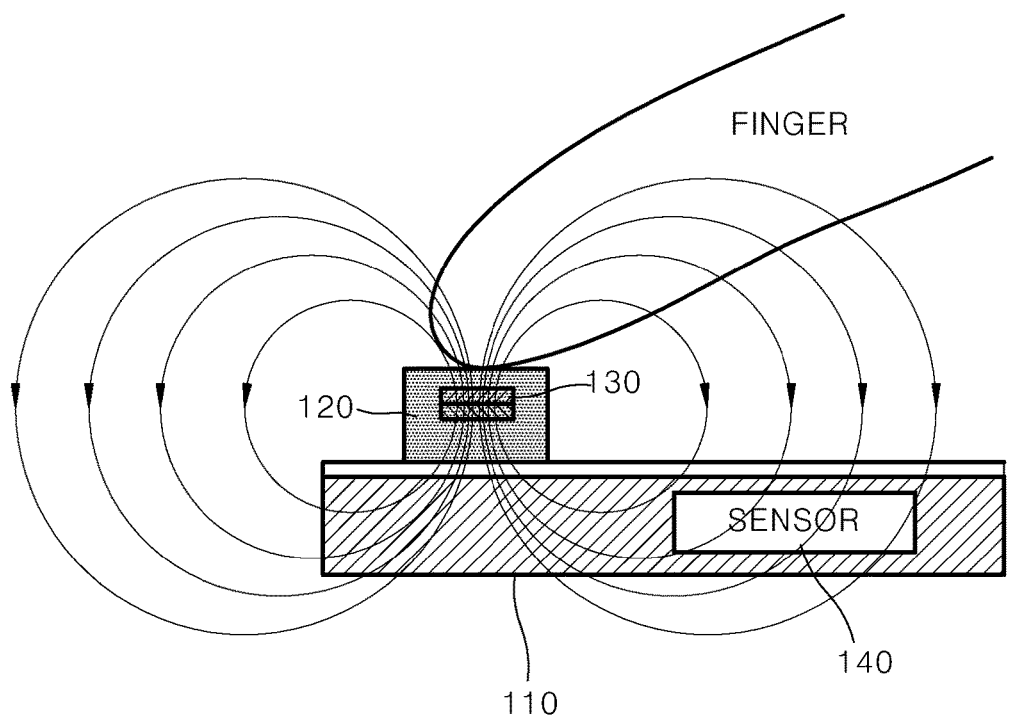
FIGS. 35 through 36 are diagrams illustrating a method of controlling a user terminal using an elastic member provided outside of a user terminal 110.
Figure 36:
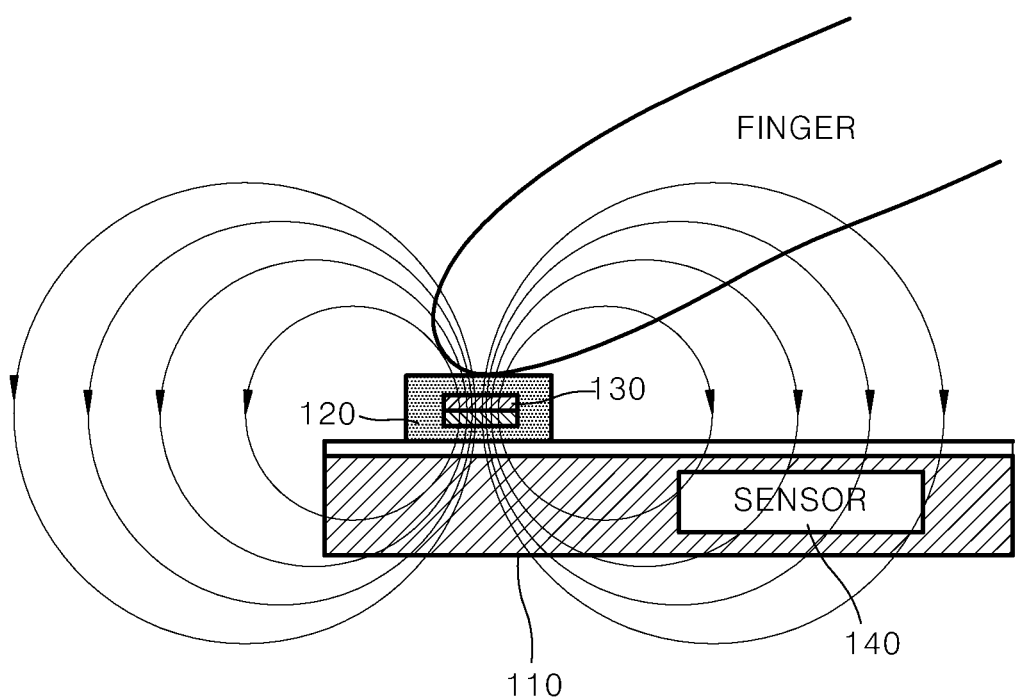

FIGS. 35 and 36 are diagrams illustrating a method of controlling a user terminal using an elastic member provided outside of a user terminal 110.

Referring to FIG. 35, the elastic member 120 attached to the outside of the user terminal 110 is provided. The elastic member 120 is a member having a shape that is easily deformable when touched by a user, and a magnet 130 is equipped in the elastic member 120. Magnetic field lines (see arrows) are formed from the magnet 130, and an extent to which the magnetic field is strong may be determined by a density of the magnetic field lines. That is, in FIG. 35, a magnetic sensor 140 is equipped in the user terminal body 110, and the density of the magnetic field lines is sensed by the magnetic sensor 140 to sense the magnetic field strength.

Referring to FIG. 36, when the user touches the elastic member 120, a distance between the magnet 130 and the user is reduced. In this instance, the magnetic field lines generated from the magnet are also transformed, and thus, the magnetic sensor 140 equipped in the user terminal body 110 senses a magnetic field strength change in response to the transformation of the magnetic field lines. The present disclosure effectively senses a strength and a location of the touch based on the magnetic field strength change (here, the touch strength is a strength of the touch applied on the user terminal through the elastic member). Particularly, the user touch of the user terminal may be effectively sensed while preventing high power consumption due to properties of a magnetic force.

Another exemplary embodiment provides a user terminal system that is subject to a kind of transformation when a user presses a body of a user terminal.

Figure 37:
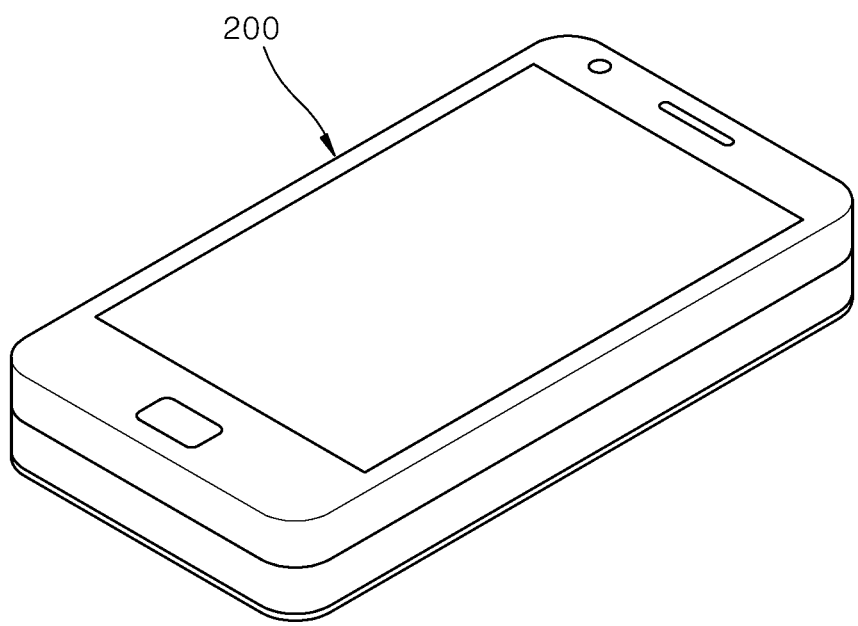
FIGS. 37 through 39 are a perspective view, an exploded perspective view, and a cross-sectional view illustrating a user terminal according to an exemplary embodiment.
Figure 38:
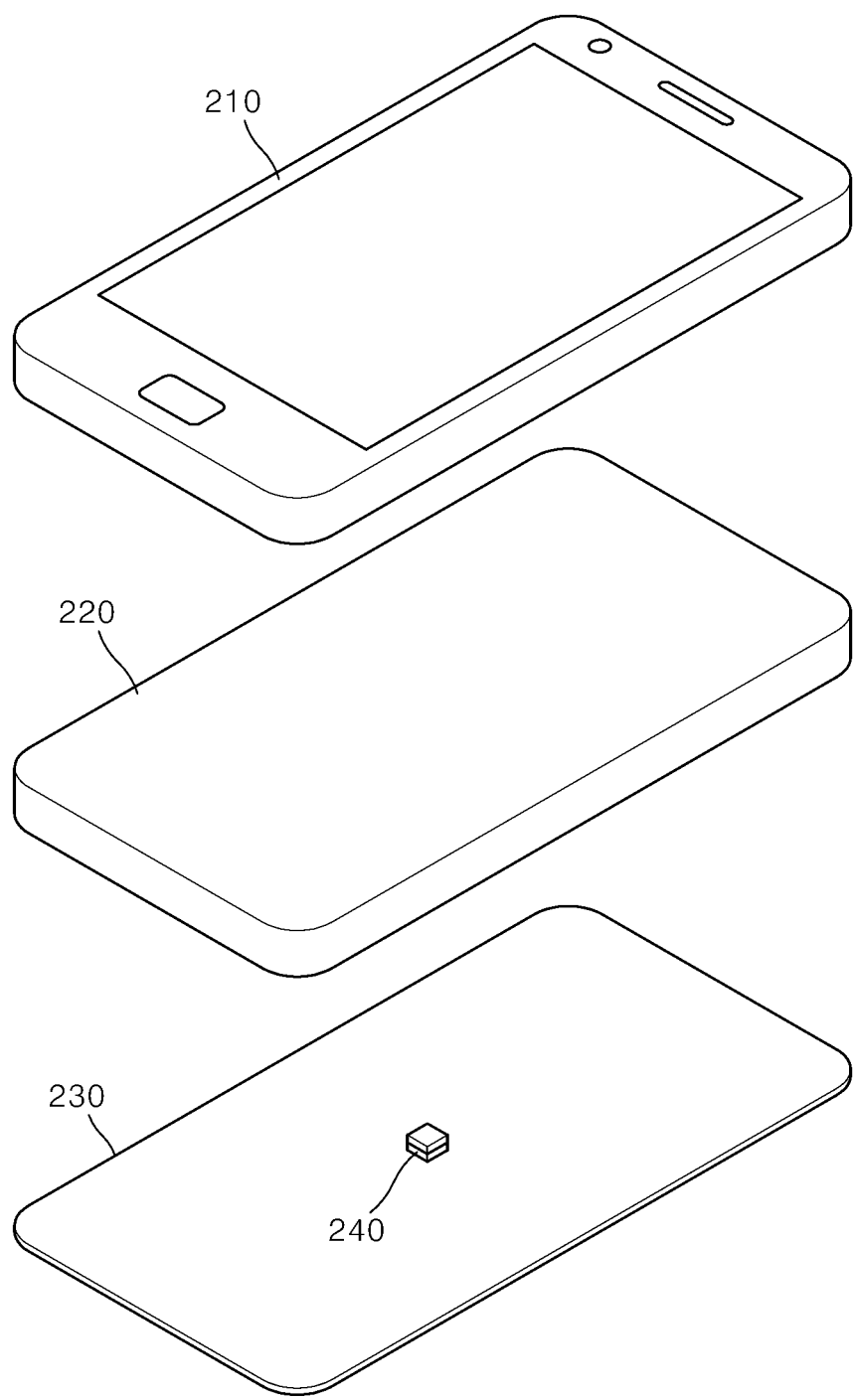
Figure 39:
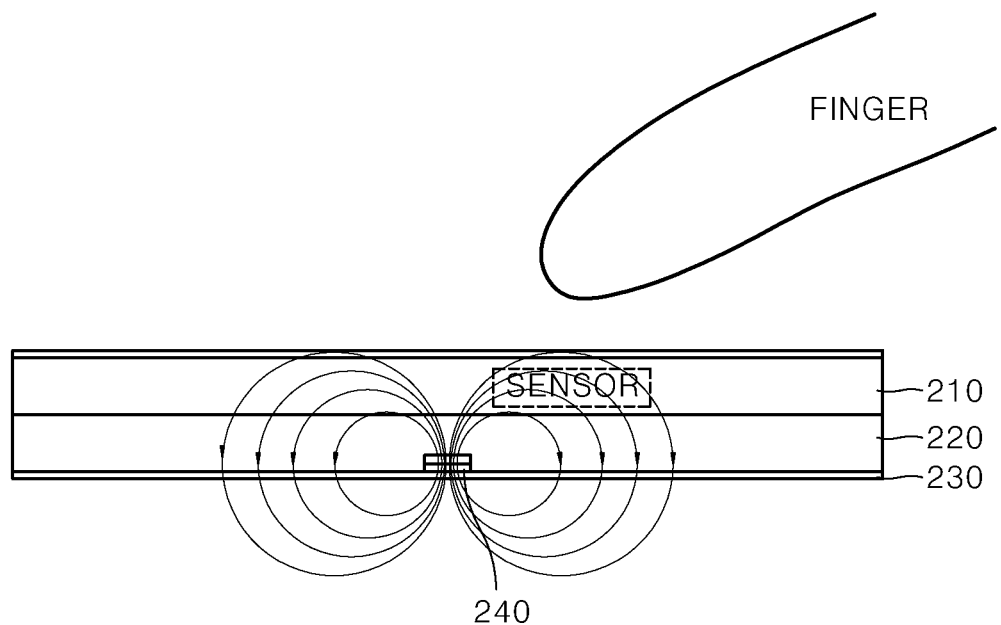

FIGS. 37 through 39 are a perspective view, an exploded perspective view, and a cross-sectional view illustrating a user terminal according to an exemplary embodiment.

Referring to FIGS. 37 through 39, a user terminal 200 according to an exemplary embodiment includes an elastic layer 220 such as, for example, a sponge, provided at one surface of a user terminal body 210, a support plate 230 provided below the elastic layer 220, and a magnet 240 is provided on the support plate. Accordingly, as a user touches a front surface of the user terminal body 210, a distance between the support plate 230 and the terminal body 210 is changed, and from this distance difference, a magnetic field strength is also changed.

Figure 40:
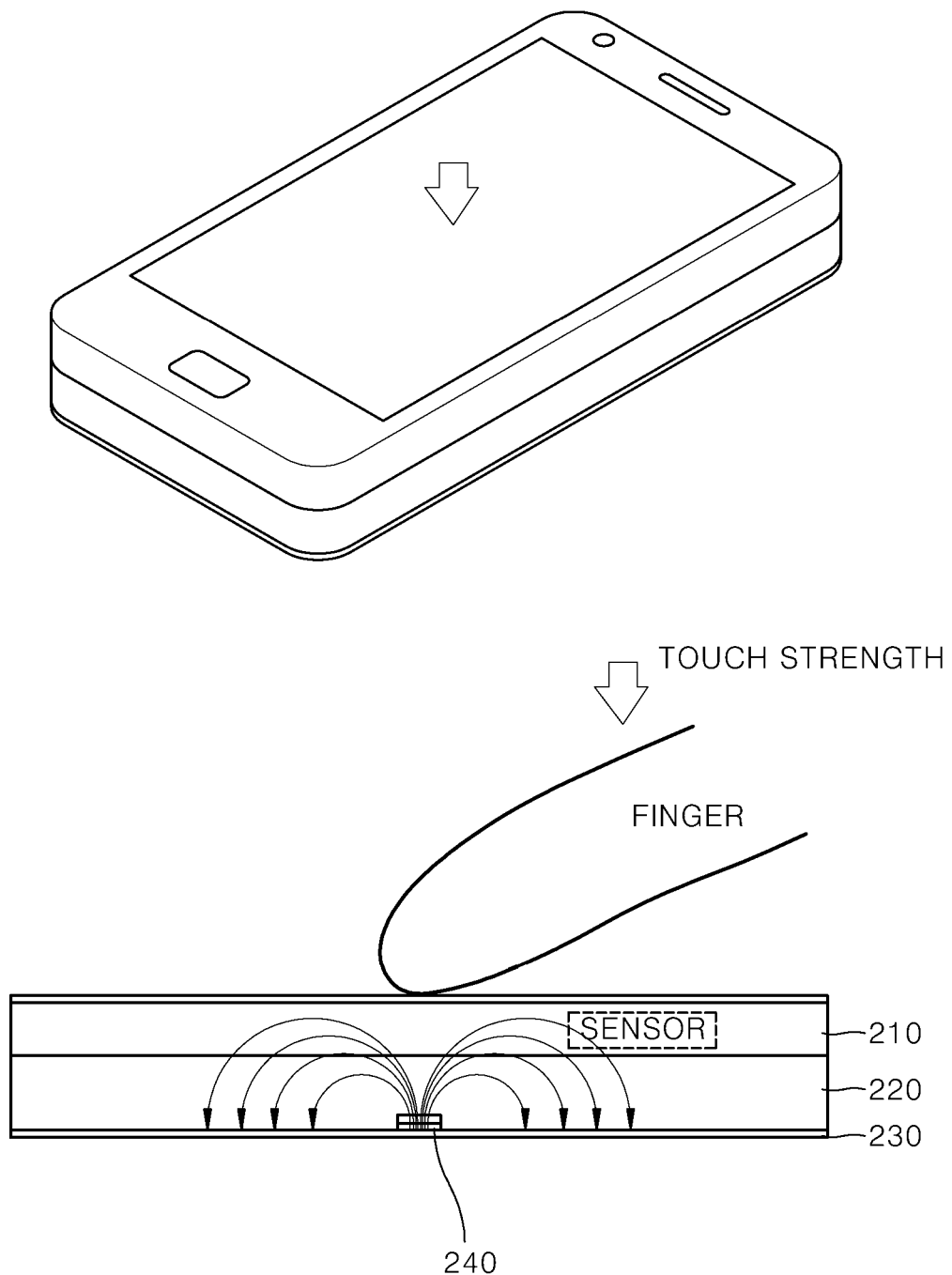
FIGS. 40 through 42 are diagrams illustrating a method of sensing a touch strength using the user terminal of FIGS. 37 through 39.
Figure 41:
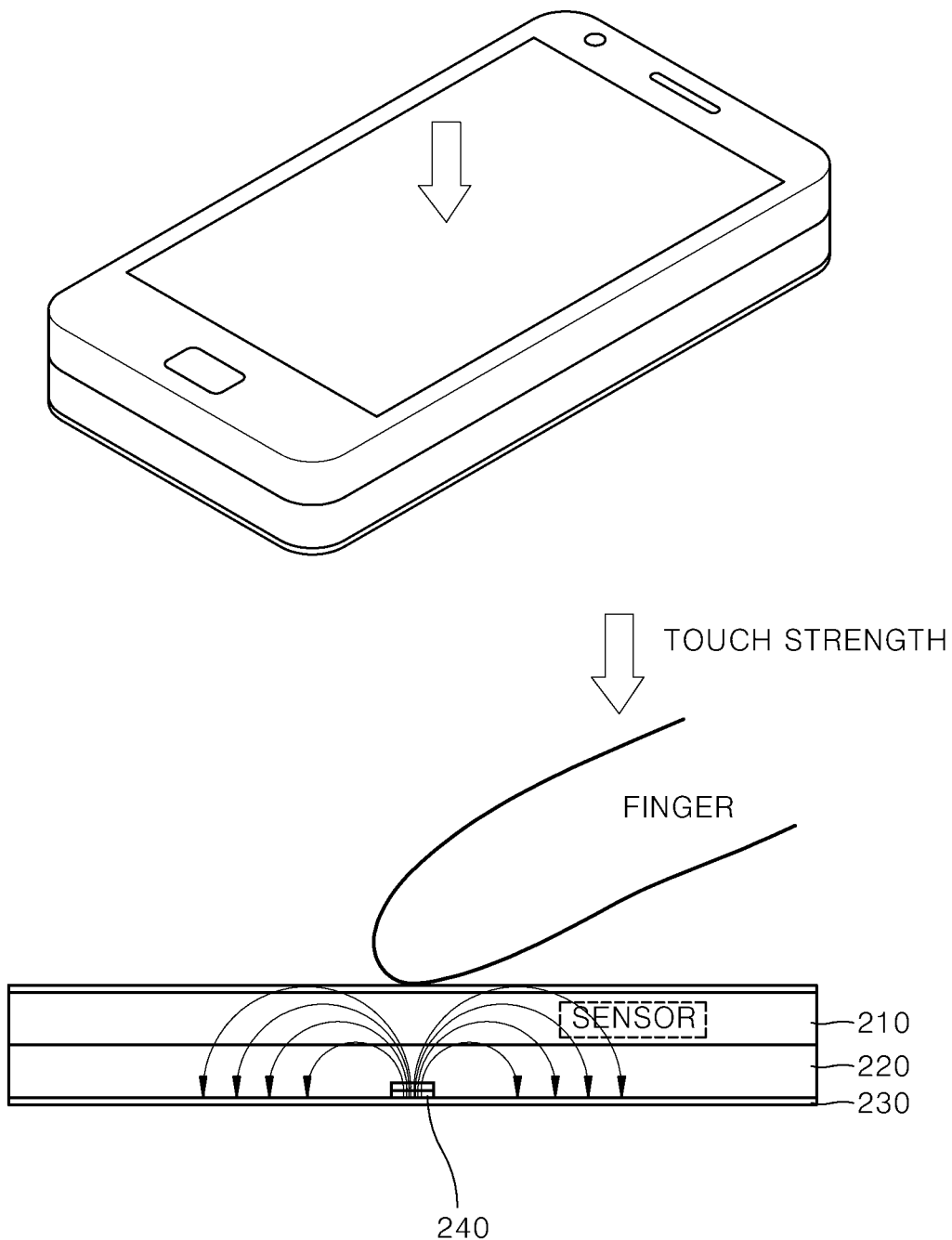
Figure 42:
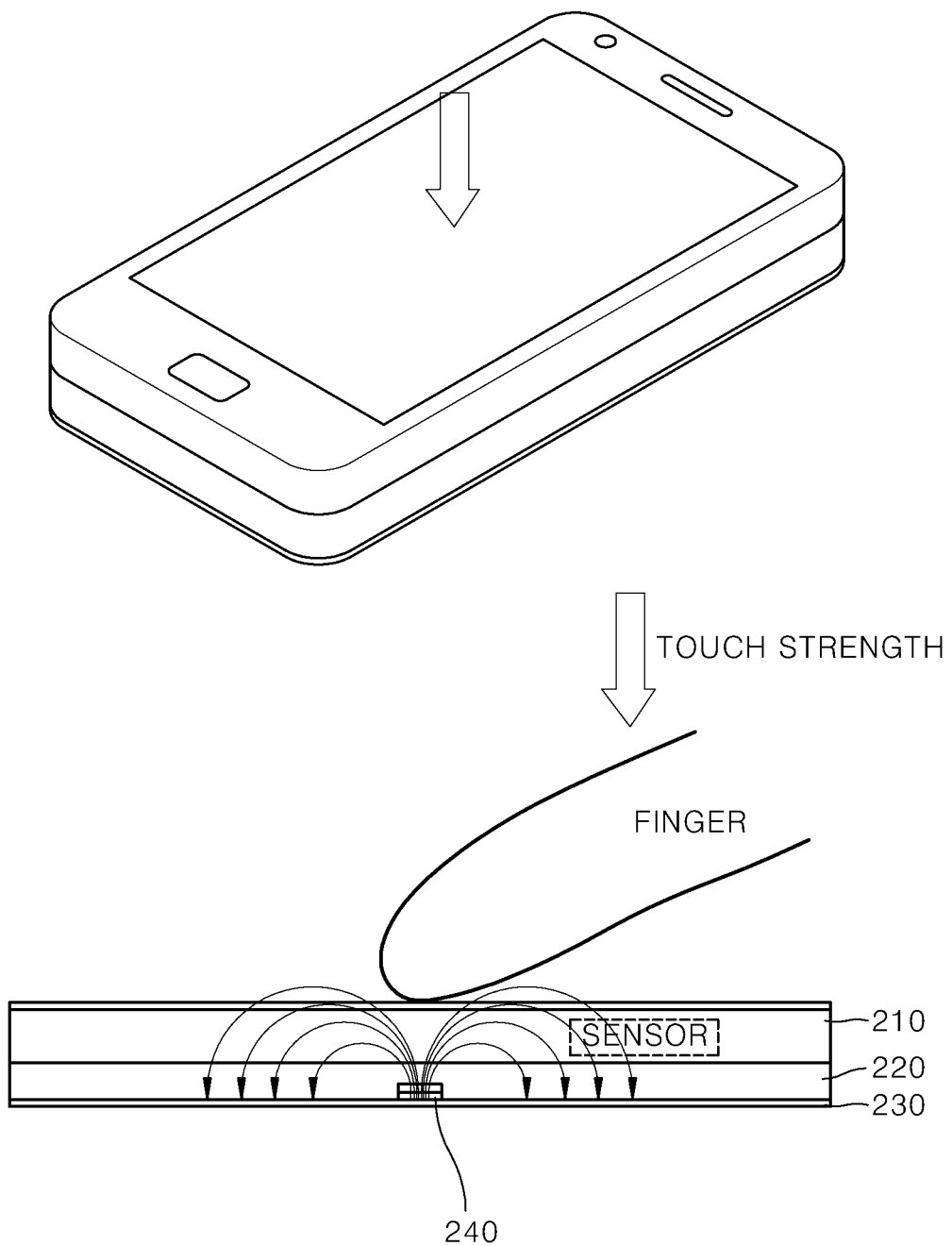

FIGS. 40 through 42 are diagrams illustrating a method of sensing a touch strength using the user terminal of FIGS. 37 through 39.

Referring to FIGS. 40 through 42, it is found that a distance between a magnetic sensor equipped in the terminal body 210 and the magnet 240 provided on the plate 230 is changed based on a pressure applied to the elastic layer 220 when the user touches a touch screen of the user terminal body 210. The present disclosure senses a touch strength through a change in the magnetic field strength based on the change in the distance between the terminal and the magnet, more specifically, the magnetic sensor equipped in the terminal and the magnet. The magnet and the magnetic sensor according to the present disclosure may be provided freely inside or outside of the user terminal body, and the scope of the present disclosure is not limited to the configuration of FIGS. 40 through 42.

Further, the present disclosure provides a method of sensing a horizontal strength of a user touch, dissimilar to a method of sensing a user touch only in a vertical direction according to a conventional art.

Figure 44:
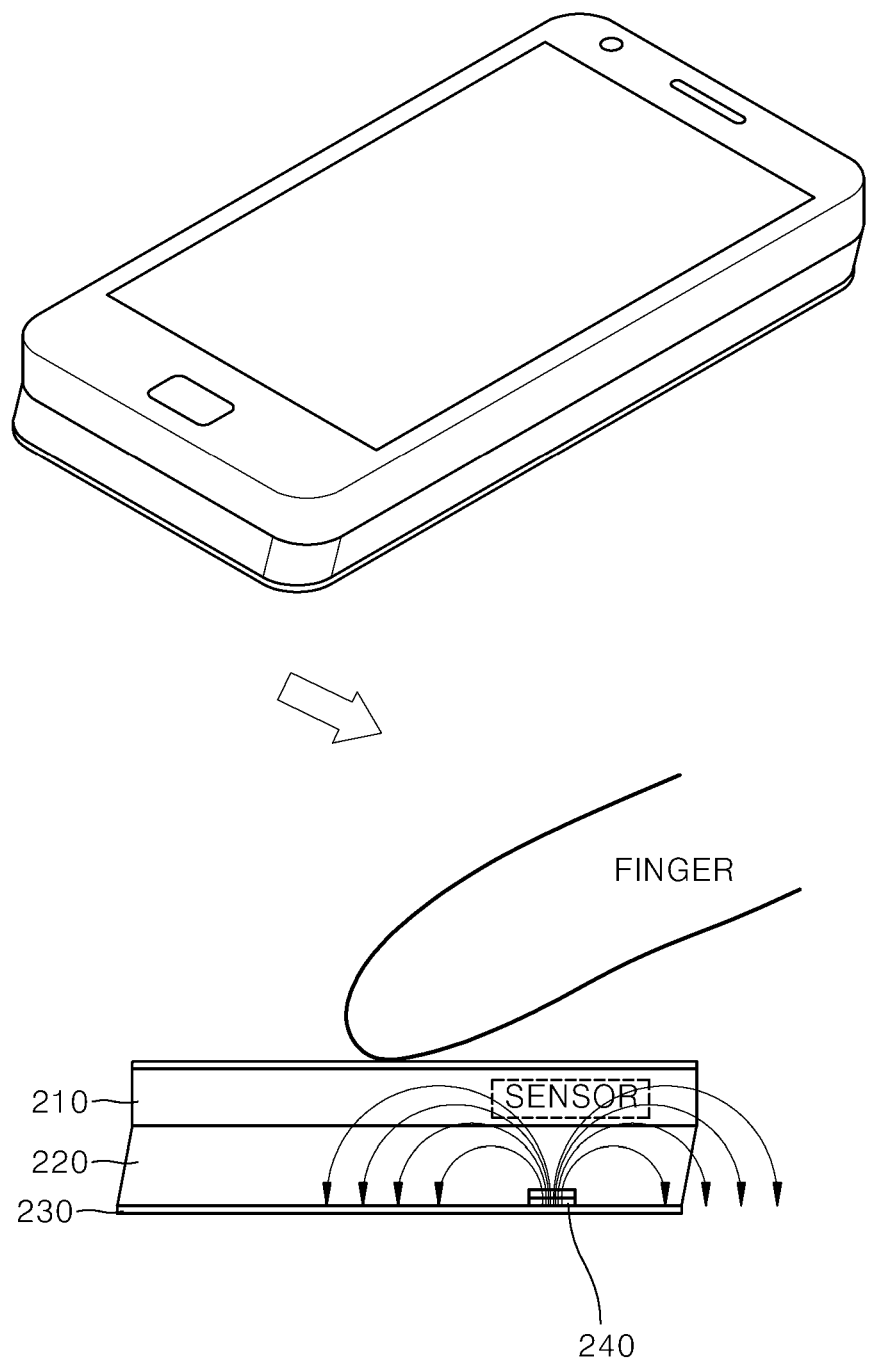
Figure 45:
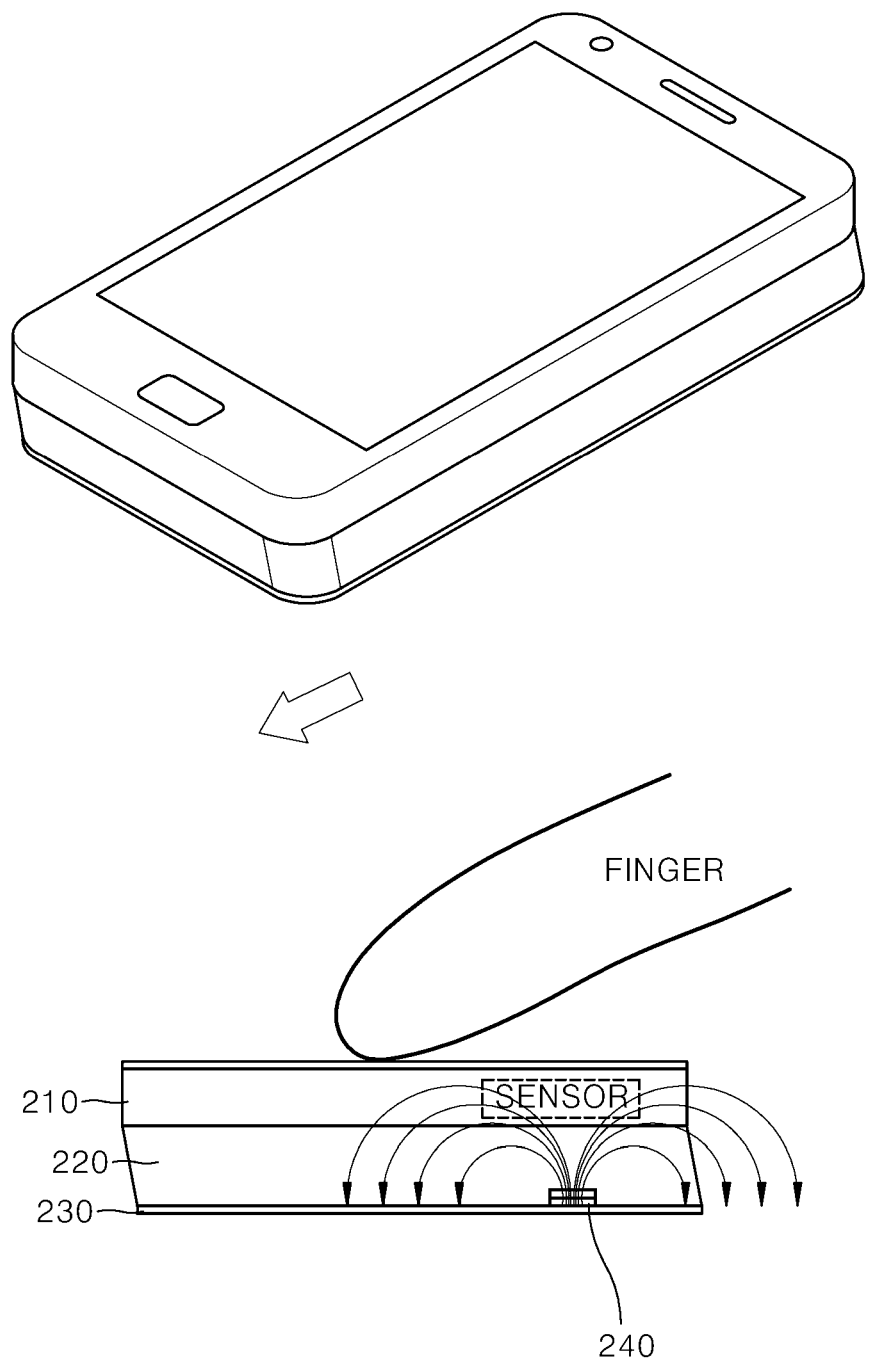

FIGS. 43 through 45 are diagrams illustrating a method of sensing a touch strength in a horizontal direction according to an exemplary embodiment.

Referring to FIGS. 43 through 45, a change in magnetic field strength occurs with a change in relative location between the magnet 240 and the magnetic sensor caused by a horizontal movement on the elastic layer 220, and a touch strength in a horizontal direction may be sensed through the change in magnetic field strength. For example, the magnetic field lines of FIG. 43 flow through the magnetic sensor with a lower density than those of FIG. 44, and thus, it may be determined that as the magnetic field becomes stronger, the touch strength in the horizontal direction increases.

FIG. 46 is a diagram illustrating a change in relative location between a magnetic sensor 240 and a magnet 250 in response to a touch in a horizontal direction.

Referring to FIG. 46, when a user terminal is touched, a change in location between the magnetic sensor 240 and the magnet 250 occurs, and as a result, a change in magnetic field strength occurs as described in the foregoing through FIGS. 42 through 45. The present disclosure may identify a touch strength and a touch location through the change in magnetic field strength, and the detailed description is provided in the foregoing.

As described hereinabove, the method, apparatus and system for controlling a user terminal may be embodied as program instructions for implementation, and computer-readable media configured to record the program instructions includes, for example, read-only memory (ROM), random access memory (RAM), CD ROM disks, magnetic tape, floppy disks, optical media storage devices, and the like.

While the foregoing description is provided to describe the principles of the present disclosure by way of illustration only, it will be apparent to those skilled in the art that various changes and modifications may be made without departing from the spirit and scope of the disclosure. Accordingly, it should be clearly understood that exemplary embodiments disclosed in the present disclosure are by way of illustration and example only and not intended to limit the spirit and scope of the disclosure, and that the present disclosure is not limited thereto. It should be understood that the spirit and scope of the present disclosure is defined by the appended claims, with equivalents of the claims to be included therein.

What is claimed is:

1. A user terminal, comprising:
   a control unit configured to control operations of the user terminal;
   a sensing unit configured to sense a motion pattern of an object having a physical shape of a rod that can be held between fingers of a user; and
   a display unit having a display screen configured to display contents in response to a control command of the control unit,
   wherein the control unit is further configured to generate the control command for controlling the display unit if the motion pattern of the object is sensed by the sensing unit,
   wherein the motion pattern is a 3D motion pattern generating a value for a change in a magnetic field of the object,
   wherein the change in the magnetic field is generated by a hand gesture using at least two fingers,
   wherein the sensing unit comprises at least two sensors provided at predetermined positions of the user terminal,
   wherein a different control command is generated based on a different combination of location of the object with respect to the positions of the sensors and different hand gestures,
   wherein the sensing unit is provided in the object or the user terminal, and the object is a pen that can be held between fingers of a user, wherein an increasing command is generated based on a combination in which the pen is located right to the user terminal and the hand gesture comprises shaking the pen in zigzags, and a decreasing command is generated based on a combination in which the pen is located left to the user terminal and the hand gesture comprises shaking the pen in zigzags.

2. The user terminal according to claim 1, further comprising:
   a parameter generating unit provided in the object to generate a parameter in response to the motion of the object.

3. The user terminal according to claim 2, wherein the motion is a spinning motion of the pen, and the spinning motion is a motion by a gesture of spinning the pen held between the fingers.

4. The user terminal according to claim 3, wherein the sensing unit senses a change in magnetic field or acceleration occurring in response to the motion of the pen.

5. The user terminal according to claim 4, further comprising:
   a communication unit provided in the object to transmit a value of the sensed change in the magnetic field or the acceleration to the user terminal.

6. The user terminal according to claim 5, wherein the control unit generates a command signal for the user terminal based on the sensing value changing based on the motion pattern by the gesture of spinning the pen after being held between fingers.

7. The user terminal according to claim 1, wherein the control command controls a displayed contents by the display unit.

8. The user terminal according to claim 1, wherein the sensing unit senses the 3D motion pattern of an object by 3-axis sensor having x-axis, a y-axis, and a z-axis,
   wherein the control unit identifies the 3D motion pattern by distinguishing the spinning motion of the object from an use activity of the object based on at least one of a speed of the motion pattern, a volume of a 3D cube including the gesture, curvedness of a trajectory, an area of each side of the 3D cube including the gesture, and a ratio of the 3D cube including the gesture, and generates the control command only when the 3D motion is sensed, wherein the object is spaced away from the user terminal, and wherein the 3D cube has the volume corresponding to a sense result of the 3-axis sensor.

9. A pen interaction system using a magnetic field, comprising:
a plurality of pens provided with a magnetic field generating unit to generate a pulsed magnetic field according to a 3D motion pattern of each pen;
a magnetic sensor provided in a user terminal to sense the pulsed magnetic field from the pen;
a pen type determining unit to determine a type of each of the pens based on a frequency of the pulsed magnetic field sensed by the magnetic sensor;
a physical displacement determining unit to determine a physical displacement and a relative location of each of the pens based on the 3D movement pattern of the pulsed magnetic field sensed by the magnetic sensor;
a command unit to determine a control command for the user terminal based on the type of the pen determined by the pen type determining unit and the physical displacement and the relative location of each of the pens determined by the physical displacement determining unit; and
a touch sensing unit provided in the user terminal to sense a touch between the pen and the user terminal,
wherein the magnetic sensor comprises at least two sensors provided at predetermined positions of the pen interaction system,
wherein a different control command is determined based on a different combination of location of the pen with respect to the positions of the sensors and different 3D movement pattern,
wherein an increasing command is determined based on a combination in which the pen is located right to the pen interaction system and the 3D movement pattern comprises shaking the pen in zigzags, and a decreasing command is determined based on a combination in which the pen is located left to the pen interaction system and the 3D movement pattern comprises shaking the pen in zigzags.

10. The pen interaction system using a magnetic field according to claim 9, wherein the physical displacement is any one of an orientation of the pen, a location of the pen, a movement direction of the pen, a movement speed of the pen, and a movement vector of the pen.

11. The pen interaction system using a magnetic field according to claim 9, wherein the movement pattern of the pulsed magnetic field is changed based on a change in the physical displacement.

12. The pen interaction system using a magnetic field according to claim 11, wherein the pattern of the pulsed magnetic field is a magnetic field pattern determined based on at least one of a magnetic field strength, a change speed of a magnetic field vector, a speed standard deviation of the magnetic field vector, a volume of a cube occupied by a magnetic field pattern trajectory, a curvedness of the magnetic field pattern trajectory, and an area of each side of the cube occupied by the magnetic field pattern trajectory.

13. The pen interaction system using a magnetic field according to claim 12, wherein the user terminal includes a touch screen, and the movement pattern of the pulsed magnetic field is determined based on a touch location of the touch screen.

14. The pen interaction system using a magnetic field according to claim 9, wherein the pulsed magnetic field is an electromagnetic field generated by a pulsed electric current.

* * * * *